(12) United States Patent
Queeney et al.

(10) Patent No.: US 11,528,399 B2
(45) Date of Patent: Dec. 13, 2022

(54) HOUSING STRUCTURE FOR HANDHELD ELECTRONIC DEVICE

(71) Applicant: Apple Inc., Cupertino, CA (US)

(72) Inventors: John K. Queeney, Mountain View, CA (US); James A. Stryker, San Francisco, CA (US); Jeremy Hill, Cupertino, CA (US); Kienan D. McCarty, Cupertino, CA (US); Lee B. Hamstra, Mountain View, CA (US); Tavys Q. Ashcroft, San Jose, CA (US); Trevor M. Cardiff, San Ramon, CA (US)

(73) Assignee: APPLE INC., Cupertino, CA (US)

( * ) Notice: Subject to any disclaimer, the term of this patent is extended or adjusted under 35 U.S.C. 154(b) by 187 days.

(21) Appl. No.: 16/880,803

(22) Filed: May 21, 2020

(65) Prior Publication Data

US 2021/0281729 A1    Sep. 9, 2021

Related U.S. Application Data

(60) Provisional application No. 62/986,588, filed on Mar. 6, 2020.

(51) Int. Cl.
*H04N 5/225* (2006.01)
*G03B 17/12* (2021.01)
*G06F 1/16* (2006.01)

(52) U.S. Cl.
CPC .......... *H04N 5/2257* (2013.01); *G03B 17/12* (2013.01); *G06F 1/1633* (2013.01); *H04N 5/2252* (2013.01); *H04N 5/2253* (2013.01); *H04N 5/2254* (2013.01); *G03B 2217/002* (2013.01)

(58) Field of Classification Search
CPC . G03B 17/12; G03B 2217/002; G06F 1/1626; G06F 1/1633; G06F 1/1686; H04N 5/2252; H04N 5/2253; H04N 5/2254; H04N 5/2257
See application file for complete search history.

(56) References Cited

U.S. PATENT DOCUMENTS

| 9,621,218 | B1* | 4/2017 | Glickman | ............ H04N 5/2257 |
| 2002/0006687 | A1* | 1/2002 | Lam | .................... H01L 31/0203 |
| | | | | 257/E31.118 |

(Continued)

*Primary Examiner* — Amy R Hsu
(74) *Attorney, Agent, or Firm* — Brownstein Hyatt Farber Schreck, LLP

(57) ABSTRACT

A tablet computing system may include a housing member defining a first portion of a back exterior surface of the tablet computer, at least a portion of a side exterior surface of the tablet computer, a raised rim extending from the back exterior surface and at least partially defining a sensor assembly hole extending through the housing member, and a support ledge positioned in the sensor assembly hole. The tablet computing system may also include a frame member positioned at least partially in the sensor assembly hole and coupled to the support ledge, a camera bracket coupled to the frame member, a first camera module coupled to the camera bracket, aa second camera module coupled to the camera bracket, the camera bracket fixing the relative positions of the first camera module and the second camera module, and a cover member positioned in the sensor assembly hole and attached to the frame member.

20 Claims, 21 Drawing Sheets

(56) References Cited

U.S. PATENT DOCUMENTS

| | | | |
|---|---|---|---|
| 2006/0203124 A1* | 9/2006 | Park | H04N 5/2252 348/E5.026 |
| 2007/0229702 A1* | 10/2007 | Shirono | H04N 5/2254 348/374 |
| 2015/0062419 A1* | 3/2015 | Hooton | H04M 1/0264 348/373 |
| 2017/0048495 A1* | 2/2017 | Scalisi | G08B 3/10 |
| 2018/0020208 A1* | 1/2018 | Woo | H05K 1/141 |
| 2018/0077328 A1* | 3/2018 | Park | H04N 5/2253 |
| 2019/0128669 A1* | 5/2019 | Nobayashi | H04N 5/2254 |
| 2019/0158643 A1 | 5/2019 | Zhang et al. | |
| 2020/0409023 A1* | 12/2020 | Kazuo | G02B 7/08 |
| 2021/0037125 A1 | 2/2021 | Jung et al. | |
| 2021/0167487 A1 | 6/2021 | Varma et al. | |
| 2021/0168229 A1 | 6/2021 | Kallman et al. | |
| 2021/0168230 A1 | 6/2021 | Baker et al. | |
| 2021/0168231 A1 | 6/2021 | Baker et al. | |
| 2021/0193012 A1 | 6/2021 | Jung et al. | |

* cited by examiner

DETAIL E-E

HOUSING STRUCTURE FOR HANDHELD ELECTRONIC DEVICE

CROSS-REFERENCE TO RELATED APPLICATION(S)

This application is a nonprovisional patent application of and claims the benefit of U.S. Provisional Patent Application No. 62/986,588, filed Mar. 6, 2020 and titled "Housing Structure for Handheld Electronic Device," the disclosure of which is hereby incorporated herein by reference in its entirety.

FIELD

The subject matter of this disclosure relates generally to electronic devices, and more particularly, to housing structures for handheld electronic devices.

BACKGROUND

Modern consumer electronic devices take many shapes and forms, and have numerous uses and functions. Tablet computing systems, for example, may include touch-sensitive displays, speakers, cameras, microphones, batteries, as well as sophisticated processors and other electronics. These and other subsystems may be integrated into compact, handheld products that provide myriad functions while being reliable and capable of withstanding daily use.

SUMMARY

A tablet computing system may include a housing member defining a first portion of a back exterior surface of the tablet computer, at least a portion of a side exterior surface of the tablet computer, a raised rim extending from the back exterior surface and at least partially defining a sensor assembly hole extending through the housing member, and a support ledge positioned in the sensor assembly hole. The tablet computing system may also include a frame member positioned at least partially in the sensor assembly hole and coupled to the support ledge, a camera bracket coupled to the frame member, a first camera module coupled to the camera bracket, aa second camera module coupled to the camera bracket, the camera bracket fixing the relative positions of the first camera module and the second camera module, and a cover member positioned in the sensor assembly hole and attached to the frame member. An exterior surface of the cover member may define a second portion of the back exterior surface of the tablet computing system.

The raised rim may define a planar top surface and the exterior surface of the cover member may be flush with or recessed relative to the planar top surface of the raised rim. The frame member may define a network of ribs configured to transfer impact force from a first portion of the housing member to a second portion of the housing member. The frame member may be fusion bonded to the housing member.

The cover member may define a first hole aligned with the first camera module and a second hole aligned with the second camera module. The tablet computing system further include a first transparent camera window positioned in the first hole and covering the first camera module, and a second transparent camera window positioned in the second hole and covering the second camera module.

The frame member may define a first datum surface and a second datum surface, and the tablet computing system may further include a first spring configured to apply a first force to the camera bracket in a first direction, thereby forcing the camera bracket against the first datum surface, and a second spring configured to apply a second force to the camera bracket in a second direction different from the first direction, thereby forcing the camera bracket against the second datum surface.

The tablet computing system may include a depth sensor coupled to the camera bracket and configured to determine a distance between the tablet computing system and an external object. The cover member may define an optically transmissive window region positioned over the depth sensor and an opaque region at least partially surrounding the optically transmissive window region.

A tablet computing system may include a housing member defining at least a portion of a back exterior surface of the tablet computing system and a raised rim extending from the back exterior surface and at least partially defining a sensor assembly hole extending through the housing member. The tablet computing system may also include a frame member positioned at least partially in the sensor assembly hole and coupled to the housing member, the frame member defining a first recess in a front side of the frame member, a second recess in a rear side of the frame member, and a first hole extending through the frame member from the first recess to the second recess. The tablet computing system may also include a cover member positioned in the sensor assembly hole and attached to the frame member, the cover member defining a second hole extending through the cover member. The tablet computing system may also include a microphone module positioned in the second recess of the frame member and configured to receive sound via an acoustic path extending through the first hole in the frame member, a volume defined between the first recess and the cover member, and the second hole in the cover member. The first hole and the second hole may be not coaxial. The tablet computing system may further include a microphone screen coupled to the cover member and covering the second hole.

The cover member may be attached to the frame member with an adhesive, and the adhesive may surround the first recess and define a hermetic seal between the frame member and the cover member around the first recess. The adhesive may be a first adhesive, the microphone module may be attached to the frame member with a second adhesive, and the second adhesive may define a hermetic seal between the frame member and the microphone module. The first and second adhesives may hermetically seal the acoustic path from an internal volume of the tablet computing system. The tablet computing system may further include a microphone screen coupled to the cover member and covering the second hole.

The cover member may define a third hole extending through the cover member, and the tablet computing system may further include a flash module coupled to the frame member and a flash window positioned in the third hole and covering the flash module.

An electronic device may include a housing member defining a first portion of a back exterior surface of the electronic device and a raised rim extending from the back exterior surface and at least partially defining a sensor assembly hole extending through the housing member. The electronic device may further include a frame member positioned at least partially in the sensor assembly hole and coupled to the housing member, a camera bracket coupled to the frame member, a first camera module coupled to the camera bracket and comprising a camera lens having a first focal length, a second camera module coupled to the camera bracket and comprising a camera lens having a second focal length different from the first focal length, and a depth sensor module coupled to the camera bracket. The depth sensor module may include an optical emitter and an optical sensor configured to detect light emitted by the optical emitter and reflected by an object external to the electronic device. The electronic device may further include a cover member positioned in the sensor assembly hole and defining a second portion of the back exterior surface of the electronic device. The electronic device may further include a microphone module coupled to the frame member and a flash module coupled to the frame member. The frame member may be welded to the housing member, and the frame member may define a network of ribs configured to transfer impact force from a first portion of the housing member to a second portion of the housing member.

The frame member defines a depth sensor hole configured to receive at least a portion of the depth sensor module, and the electronic device may further include a conductive cowling at least partially surrounding the depth sensor hole and defining a plurality of conductive tabs extending into the depth sensor hole and a compliant material configured to bias the plurality of conductive tabs against the depth sensor module.

The frame member may be conductively coupled to a ground plane of the electronic device, and the depth sensor module may be conductively coupled to the frame member via the conductive cowling. The conductive cowling may include a metal foil.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Modern portable electronic devices are complex devices that include many complex, sophisticated components and systems that facilitate a multitude of functions. For example, tablet computers according to the instant disclosure may include touch- and/or force-sensitive displays, numerous cameras (including both front- and rear-facing cameras), GPS systems, haptic actuators, wireless charging systems, and all requisite computing components and software to operate these (and other) systems and otherwise provide the functionality of the tablet computers. To maintain the portability and usability of such devices, these systems must be physically integrated into small, thin, and lightweight devices, while also ensuring that the devices remain robust and capable of everyday use.

Figure 1A:
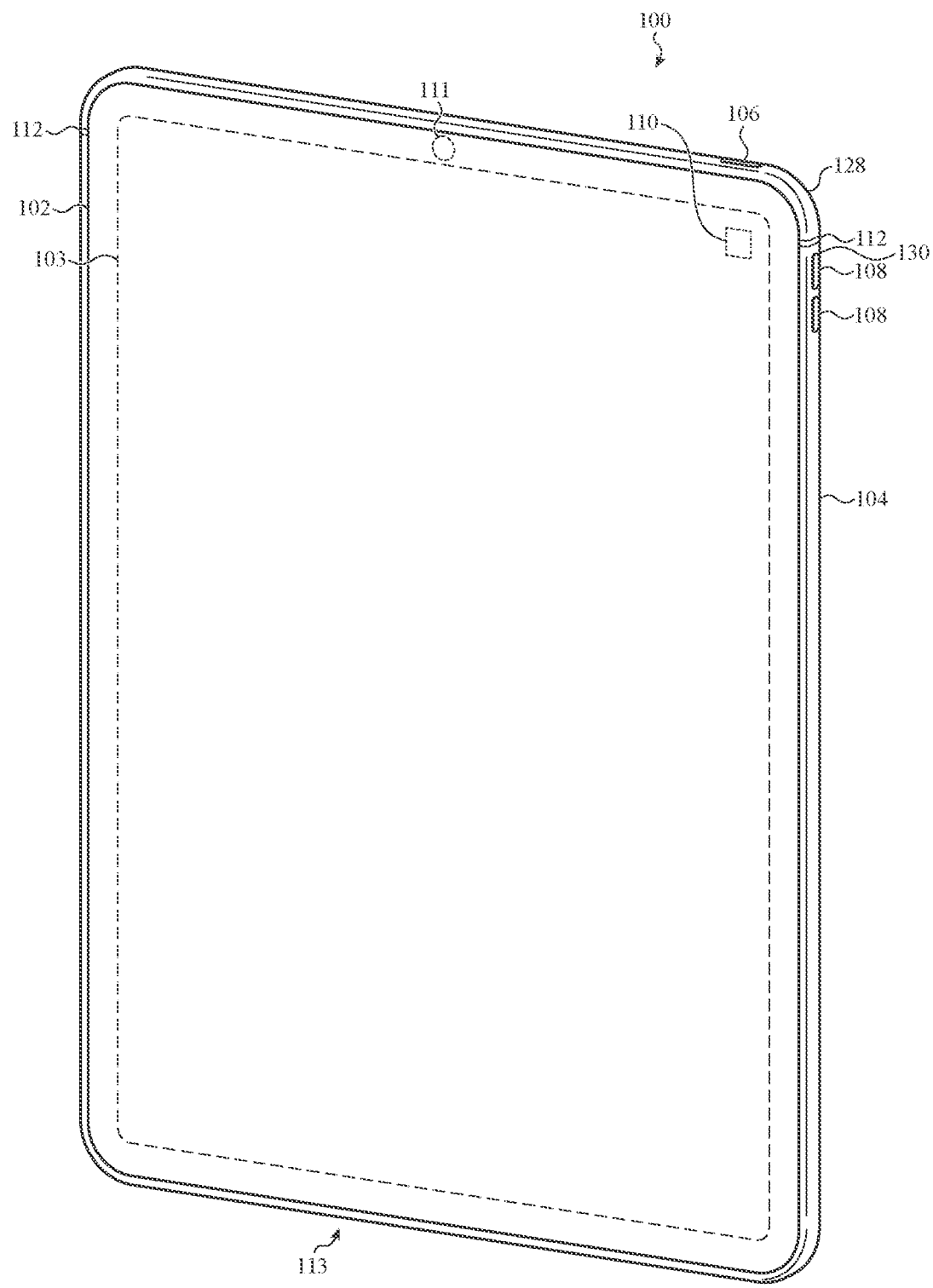
FIGS. 1A-1B depict an example electronic device.

FIG. 1A shows an example electronic device 100 embodied as a tablet computing system, also referred to as a tablet computer. While the device 100 is a tablet computer, the concepts presented herein may apply to any appropriate electronic devices, including wearable devices (e.g., watches), laptop computers, handheld gaming devices, mobile phones, computing peripherals (e.g., mice, touchpads, keyboards), or any other device. Accordingly, any reference to an "electronic device" encompasses any and all of the foregoing.

The electronic device 100 includes a cover 102 (e.g., a front cover), such as a glass, glass-ceramic, ceramic, plastic, sapphire, or other substantially transparent material, component, or assembly, attached to a housing 104. The cover 102 may be positioned over a display 103. The cover 102 may be formed from glass (e.g., a chemically strengthened glass), sapphire, ceramic, glass-ceramic, plastic, or another suitable material. The cover 102 may be formed as a monolithic or unitary sheet. The cover 102 may also be formed as a composite of multiple layers of different materials, coatings, and other elements.

The display 103 may be at least partially positioned within the internal volume of the housing 104. The display 103 may be coupled to the cover 102, such as via an adhesive or other coupling scheme. The display 103 may include a liquid-crystal display (LCD), light-emitting diode, organic light-emitting diode (OLED) display, an active layer organic light emitting diode (AMOLED) display, organic electroluminescent (EL) display, electrophoretic ink display, or the like. The display 103 may be configured to display graphical outputs, such as graphical user interfaces, that the user may view and interact with. The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor).

The display 103 may include or be associated with one or more touch- and/or force-sensing systems. In some cases, components of the touch- and/or force-sensing systems are integrated with the display stack. For example, electrode layers of a touch- and/or force-sensor may be provided in a stack that includes display components (and is optionally attached to or at least viewable through the cover 102). The touch- and/or force-sensing systems may use any suitable type of sensing technology, including capacitive sensors, resistive sensors, surface acoustic wave sensors, piezoelectric sensors, strain gauges, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system. The device 100, using the touch- and/or force-sensing systems may be configured to detect inputs applied to the cover 102. Such inputs include, for example, touch inputs applied by one or more fingers, a stylus, or another implement. Touch-based inputs applied using fingers, styli, or other implements may include touches, taps, single- or multi-finger gestures (e.g., swipes, pinching gestures, etc.), handwriting inputs, drawing inputs, or the like. In some cases, force sensing systems detect an amount of force associated with a touch-based input. The device 100 may take different actions based on the amount of force detected. For example, if a touch-based input (applied to a selectable element displayed on the display 103, for example) is associated with a force that is below a threshold, the device 100 may take a first action (e.g., launch an application associated with the selectable element), and if the touch-based input is associated with a force that exceeds the threshold, the device 100 may take a second action (e.g., display a menu associated with the selectable element). Other actions are also contemplated.

The device 100 may also include a front-facing camera 111. The front-facing camera 111 may be positioned below or otherwise covered and/or protected by the cover 102. The front-facing camera 111 may have any suitable operational parameters. For example, the front-facing camera 111 may include a 12 megapixel sensor (with 1 micron pixel size), and an 80-90° field of view. The front-facing camera 111 may have fixed focus optical elements with an aperture number of f/1.8. Other types of cameras may also be used for the front-facing camera 111.

The device 100 may also include one or more buttons (e.g., buttons 106, 108), switches, and/or other physical input systems. Such input systems may be used to control power states (e.g., the button 106), change speaker volume (e.g., buttons 108), switch between "ring" and "silent" modes, and the like.

The device 100 may also include a charging port 113 (e.g., for receiving a power cable for providing power to the device 100 and charging the battery of the device 100). The device 100 may also include one or more speakers and one or more microphones. The housing 104 may include audio openings to allow sound (produced by internal speakers) to exit the housing 104 and to allow an internal microphone to be acoustically coupled to the surrounding environment through an audio opening.

The housing 104 may be a multi-piece housing. For example, the housing 104 may be formed from multiple housing members 128, 130, which are structurally coupled together via one or more joint structures 112. The joint structure 112 may be mechanically interlocked with the housing members 128, 130 to structurally couple the housing members and form a structural housing assembly. Together, the housing members 128 and 130 and the joint structure 112 may define four sidewalls (and thus four exterior side surfaces) of the device 100. Thus, both the housing members and the joint structures define portions of the exterior side surfaces of the device 100. For example, the housing member 128 may define a first side surface the electronic device, and portions of second and third side surfaces of the electronic device. The housing member 130 may also define portions of the second and third side surfaces of the electronic device, and a fourth side surface. The housing member 130 may also define substantially all of the back exterior surface of the device 100. The housing member 130 may be a unitary structure, such as a single piece of metal (or other suitable material), that defines portions of the back surface and two, three, or four side surfaces. (In some cases, the housing member 130 may be configured to only define a back surface of the device 100.)

The housing members 128 and 130 may be formed of a conductive material (e.g., a metal such as aluminum, stainless steel, or the like), and the joint structure 112 may be formed of one or more polymer materials (e.g., glass-reinforced polymer). The joint structure 112 may include one or more molded elements. The joint structure 112 may be formed of a polymer material (e.g., a fiber-reinforced polymer). In the case where the joint structure 112 is formed of two or more molded elements, the molded elements may be formed of different materials. For example, an inner molded element may be formed of a first material (e.g., a polymer material), and an outer molded element may be formed of a second material that is different from the first (e.g., a different polymer material). The materials may have different properties, which may be selected based on the different functions of the inner and outer molded elements. For example, the inner molded element may be configured to make the main structural connection between housing members, and may have a higher mechanical strength and/or toughness than the outer molded element. On the other hand, the outer molded element may be configured to have a particular appearance, surface finish, chemical resistance, water-sealing function, or the like, and its composition may be selected to prioritize those functions over mechanical strength).

In some cases, one or more of the housing members 128, 130 (or portions thereof) are configured to operate as antennas (e.g., members that are configured to transmit and/or receive electromagnetic waves to facilitate wireless communications with other computers and/or devices). To facilitate the use of the housing members as antennas, feed and ground lines may be conductively coupled to the housing members to couple the housing members to other antenna and/or communication circuitry. Further, the joint structure 112 may be substantially non-conductive to provide suitable separation and/or electrical isolation between the housing members. The joint structure 112 may be used to tune the radiating portions, reduce capacitive coupling between radiating portions and other structures, and the like. In addition to the housing members 128, 130, some or all of which may be used as antennas, the device 100 may also include various internal antenna elements that are configure to transmit and receive wireless communication signals through various regions of the housing 104.

The exterior surfaces of the housing members 128, 130 may have substantially a same color, surface texture, and overall appearance as the exterior surfaces of the joint structure 112. In some cases, the exterior surfaces of the housing members 128, 130 and the exterior surfaces of the joint structure 112 are subjected to at least one common finishing procedure, such as abrasive-blasting, machining, polishing, grinding, or the like. Accordingly, the exterior surfaces of the housing members and the joint structures may have a same or similar surface finish (e.g., surface texture, roughness, pattern, etc.). In some cases, the exterior surfaces of the housing members and the joint structures may be subjected to a two-stage blasting process to produce the target surface finish.

The device 100 may also include a sensor 110. The sensor 110 may be configured to detect a presence or configuration of an accessory. For example, a foldable cover accessory may be provided for use with the device 100. The sensor 110 may be configured to detect whether the cover accessory is in an open configuration (e.g., so the cover 102 is exposed, graphical outputs on the display 103 are visible, and the user may provide touch-based inputs on the cover 102). The device 100 may take different actions in response to detecting whether the cover accessory is open or closed, and/or based on detecting a transition (e.g., when the cover accessory transitions from opened to closed, or vice versa). For example, the device 100 may activate the display 103 upon detecting that the cover accessory has been opened, and deactivate the display 103 upon detecting that the cover accessory has been closed.

The sensor 110 may be configured to detect a component or material of the accessory cover. For example, the sensor 110 may be a Hall effect sensor, an optical sensor, a reed switch, a magnetometer, an inductive sensor, or any other suitable sensor or sensor system. In some cases, the sensor 110 (e.g., a Hall effect sensor) may detect the presence of a magnet in the cover accessory, where the magnet is positioned so that it is proximate the sensor 110 when the cover accessory is in a closed configuration. The sensor 110 may be positioned below (or behind) the display 103, and may sense the presence of the cover accessory through the cover 102, the display 103, components of the touch- and/or force-sensing systems, or the like.

Figure 1B:
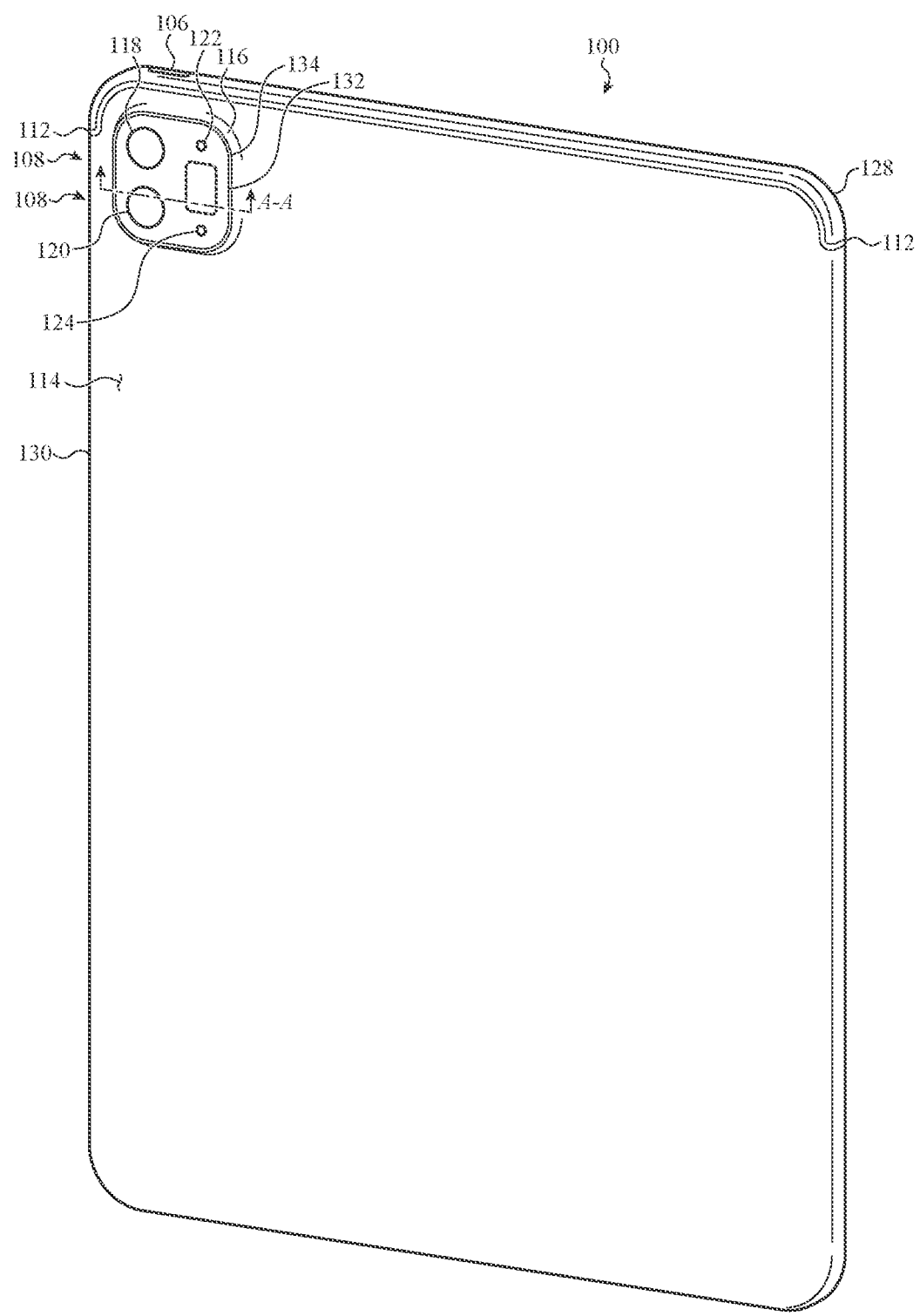

FIG. 1B illustrates a back side of the device 100. The housing members 128, 130 and the joint structure 112 may each define part of a back surface 114 of the device 100. The device 100 may also include a rear-facing sensor region 116. The rear-facing sensor region 116 may include a cover member 132, which may be set into an opening in the housing member 130. The housing member 130 may define a raised rim 134 that surrounds the outer perimeter of the cover member 132. The cover member 132 may overlie various types of input and output devices, including but not limited to one or more cameras, a flash, a microphone, a depth- or distance-sensing device, an ambient-light sensor, or the like. The cover member 132 may define openings in which other components may be positioned (e.g., meshes, windows, or the like), sensor windows (e.g., areas that are transparent to visible light, infrared light, or the like), or the like.

The device 100 may include, in or otherwise associated with the rear-facing sensor region 116, a first camera 118, a second camera 120, and a flash 122. The first camera 118 may be a super-wide angle camera having a 12 megapixel sensor and a camera lens with a first focal length (or range of focal lengths), a wide field of view (e.g., 120° FOV) optical stack with an aperture number of f/2.4, and the second camera 120 may be a wide angle camera having a 12 megapixel sensor, a second focal length (or range of focal lengths) different from the first focal length, and an aperture number of f/1.6. In some cases, the first and second cameras may have other optical properties and/or performance. For example, the first or the second camera may be a telephoto camera having a 12 megapixel sensor with a 2× optical zoom optical stack and having an aperture number ranging from f/2.0 to f/2.2. One or more of the cameras 118, 120 may also include optical image stabilization, whereby the camera lens is dynamically moved relative to a fixed structure within the device 100 to reduce the effects of "camera shake" on images captured by the camera. The camera may also perform optical image stabilization by moving the image sensor relative to a fixed lens or optical assembly.

The cameras 118, 120, along with associated processors and software, may provide several image-capture features. For example, the cameras 118, 120 may be configured to capture full-resolution video clips of a certain duration each time a user captures a still image. As used herein, capturing full-resolution images (e.g., video images or still images) may refer to capturing images using all or substantially all of the pixels of an image sensor, or otherwise capturing images using the maximum resolution of the camera (regardless of whether the maximum resolution is limited by the hardware or software).

The captured video clips may be associated with the still image. In some cases, users may be able to select individual frames from the video clip as the representative still image associated with the video clip. In this way, when the user takes a snapshot of a scene, the camera will actually record a short video clip (e.g., 1 second, 2 seconds, or the like), and the user can select the exact frame from the video to use as the captured still image (in addition to simply viewing the video clip as a video).

The cameras 118, 120 may also include one or more cameras having a high-dynamic-range (HDR) mode, in which the camera captures images having a dynamic range of luminosity that is greater than what is captured when the camera is not in the HDR mode. In some cases, the cameras 118, 120 automatically determine whether to capture images in an HDR or non-HDR mode. Such determination may be based on various factors, such as the ambient light of the scene, detected ranges of luminosity, tone, or other optical parameters in the scene, or the like. HDR images may be produced by capturing multiple images, each using different exposure or other image-capture parameters, and producing a composite image from the multiple captured images.

The cameras 118, 120 may also include or be configured to operate according to an object detection mode, in which a user can select (and/or the device 100 can automatically identify) objects within a scene to facilitate those objects being processed, displayed, or captured differently than other parts of the scene. For example, a user may select (or the device 100 may automatically identify) a person's face in a scene, and the device 100 may focus on the person's face while selectively blurring the portions of the scene other than the person's face. Notably, features such as the HDR mode and the object detection mode may be provided with a single camera (e.g., a single lens and sensor).

The flash 122 is configured to illuminate a scene to facilitate capturing images with the cameras 118, 120. The flash 122 may include one or more light sources, such as one or more light emitting diodes (e.g., 1, 2, 3, 4, or more LEDs). The flash 122, in conjunction with the cameras 118, 120 or other systems of the device 100, may adjust the color temperature of the light emitted by the light sources in order to match or otherwise adapt to a color temperature within a scene being captured. The device 100 may also be configured to operate the flash 122 and the shutters of the cameras 118, 120 to avoid consequences of flash "flicker." For example, the device 100 may avoid capturing exposures during moments where the flash 122 is at a period of no or low illumination (e.g., which may be caused by discontinuous or pulsed operation of the LEDs).

The device 100 may also include, in or otherwise associated with the rear-facing sensor region 116, a microphone 124 and a depth sensor 126. The microphone 124 may be configured to capture audio, and may be associated with an opening in the cover member 132. The microphone 124 and its physical integration in the device 100 are described herein with respect to FIGS. 7A-7C. The depth sensor 126 may be configured to estimate a distance between the device 100 and a separate object or target. The depth sensor 126 may include an emitter and a receiver, and may configured to emit and receive light through the material of the cover member 132. The depth sensor 126 and its physical integration in the device 100 are described herein with respect to FIGS. 6A-6D.

Figure 2A:
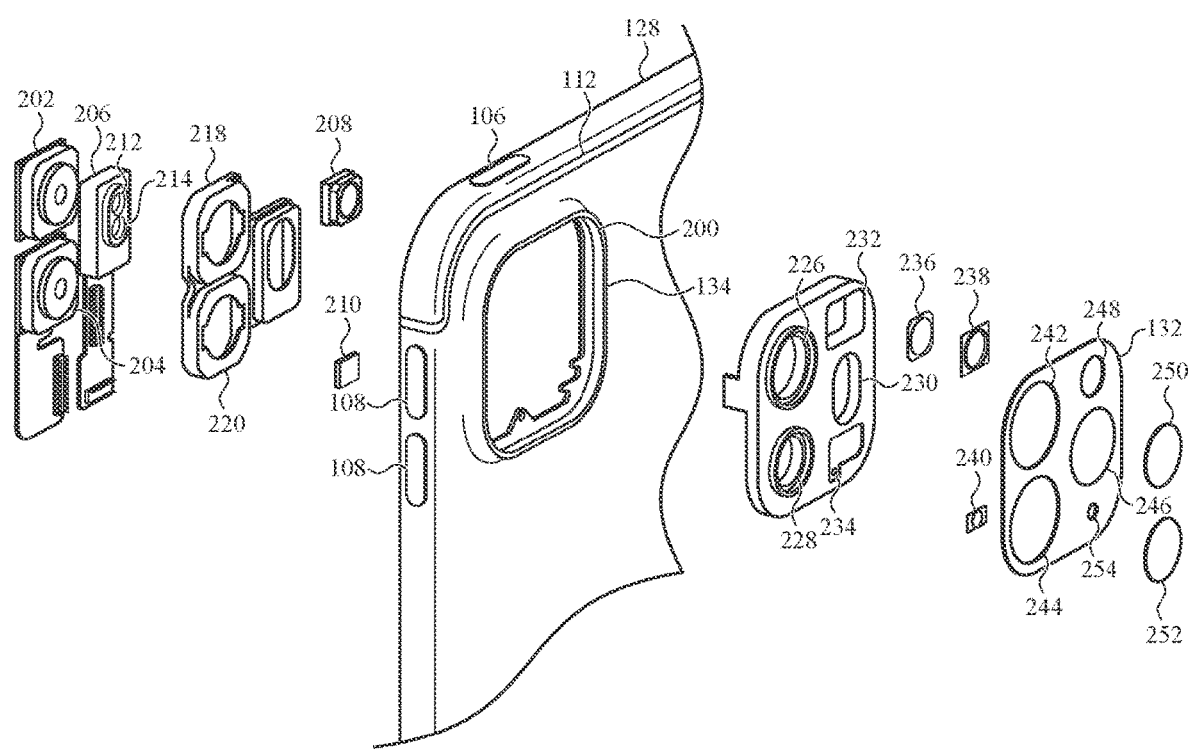
FIG. 2A depicts an exploded view of an example electronic device.

FIG. 2A depicts an exploded view of a portion of the electronic device 100. In particular, FIG. 2A depicts an exploded view of a portion of the device 100 that includes the rear-facing sensor region 116 (also referred to herein simply as the sensor region 116). The housing member 130 may define a raised rim 134, and the raised rim 134, in turn, defines a sensor assembly hole 200 (or simply hole 200) that extends through the housing member 130. The hole 200 may accommodate components of the sensor region 116, such as the cameras 118, 120, the flash 122, the microphone 124, and the depth sensor 126. For example, the hole 200 may provide internal components with optical, audio, or other access to the environment surrounding the device 100 (e.g., so that cameras can capture images, a flash can illuminate scenes, a microphone can receive audio, etc.). In some cases, more, fewer, or different components may be accommodated within or proximate the hole 200.

FIG. 2A illustrates first and second camera modules 202, 204, which may include the camera lenses and sensors of the first and second cameras 118, 120, respectively. FIG. 2A also illustrates a depth sensor module 206, which may include one or more sensors, emitters, and lenses of the depth sensor 126. For example, the depth sensor module 206 may include one or more optical emitters 212 that are adapted to emit one or more beams of light, which may be used to estimate the distance. In some cases, the one or more beams of light are coherent light beams having a substantially uniform wavelength/frequency. A coherent light source may facilitate depth measurements using a time of flight, phase shift, or other optical effect. The depth sensor module 206 may also include an optical sensor 214 (as well as associated lenses) that uses time-of-flight or another optical effect to measure a distance between the device 100 and an external object. For example, the optical sensor 214 may detect the reflected light emitted from the optical emitter 212. In some cases, the depth sensor module 206 uses a sonic output, radio output, or other type of output that may be used to measure the distance between the device 100 and one or more external objects.

FIG. 2A also illustrates a flash module 208 and a microphone module 210. As described herein, the flash module 208 may include one or more light sources and be configured to illuminate a scene to facilitate capturing images with the cameras. The microphone module 210 may include a diaphragm, membrane, or other transducer component(s) for detecting sound. The camera modules 202, 204, the depth sensor module 206, the microphone module 210, and the flash module 208 may all be positioned in the rear-facing sensor region 116 (FIG. 1B), and may be configured to interface with the exterior environment of the device 100 through the hole 200 and the cover member 132.

The device 100 may also include a bracket member 216 (also referred to herein as a camera bracket) to which the camera modules 202, 204 and the depth sensor module 206 may be coupled. The bracket member (or camera bracket) 216 may define a first container portion 218 configured to receive the first camera module 202, a second container portion 220 configured to receive the second camera module 204, and a third container portion 222 configured to receive the depth sensor module 206. Each container portion may define openings for the optical components of the camera modules and depth sensor modules. The container portions may define flanges or side walls that at least partially surround the camera modules and the depth sensor module. The bracket member 216 may be configured to fix the relative positions of the camera modules and the depth sensor module. For example, the relative positions and/or orientations of the camera modules and the depth sensor module may be important to ensure proper operation of the features and/or functions of the camera modules and the depth sensor module. For example, in some cases it is necessary or desirable for the optical axes of the camera modules and the depth sensor module (where an optical axis may refer to a line that defines the path along which light propagates through the lenses of the modules) to be parallel or to converge at a predetermined distance away from the device 100. As another example, it is necessary or desirable for the offset between the camera modules and the depth sensor module (e.g., the offset along the optical axes) to be set at a predetermined distance. Such alignment and positioning may be necessary or desirable to provide functions such as camera focus assistance, depth mapping, image processing, or the like, and employing a common structure (such as the bracket member 216) to which the camera modules and the depth sensor module are coupled may help establish and maintain the desired alignment and positioning. Notably, the bracket member 216 may establish and maintain any desired alignment, positioning, orientation, offset, or other spatial parameter, that results in the proper functioning of the optical systems.

The device 100 may also include a frame member 224. The frame member 224 may be positioned in the hole 200 and attached to the housing member 130. The frame member 224 may improve the strength, stiffness, or other physical property of the housing member 130. For example, the frame member 224 may compensate for the reduced strength and/or stiffness of the housing member 130 resulting from the hole 200 being formed in the housing member 130. The frame member 224 may define first, second, and third openings 226, 228, 230 for the first camera module 202, the second camera module 204, and the depth sensor module 206, respectively. The frame member 224 may also define a fourth opening 232 for the flash module 208 and a fifth opening 234 for the microphone module 210. The openings in the frame member 224 may at least partially receive the respective modules, and may provide optical, acoustic, or other access through the frame member 224. The openings in the frame member 224 may receive other components as well. For example, a flash module trim member 238 may be positioned in or adjacent the fourth opening 232, and may help retain the flash module 208 (as well as a flash window 236) in place.

The frame member 224 may be formed of or include steel, aluminum, magnesium, titanium, a polymer (e.g., a fiber-reinforced polymer), a composite, or any other suitable material(s). The frame member 224 may include a coating. For example, the frame member 224 may include a diamond-like carbon (DLC) coating, a metal or metallic coating, an oxide coating, or any other suitable coating (applied using plasma vapor deposition (PVD), chemical vapor deposition (CVD), electroplating, etc.). In some cases, the frame member 224 is anodized, oxidized, or otherwise processed to produce an outer shell or layer having a different composition than an underlying portion of the frame member 224. In some cases, the exterior coatings, layers, or other treatments may provide a desired optical property, such as to impart a particular reflectance, color, or the like, to the surface of the frame member 224. In some cases, less than all of the surfaces of the frame member 224 are coated as described above. For example, in some cases only the outward-facing surfaces include a coating.

FIG. 2A also illustrates the cover member 132, which may overlie the frame member 224 and may define an exterior surface of the device 100. For example, the exterior surface of the cover member 132 may be a cosmetic, exterior surface of the electronic device 100 in the area of the rear-facing sensor region 116. The cover member 132 may be formed of sapphire, glass, polymer, ceramic, or the like. The cover member 132 may be formed of a transparent material. In other implementations, the cover member 132 may be formed of an opaque or non-transparent material.

In some cases, some or all of the exterior or interior surfaces of the cover member 132 may include a coating such as a paint, ink, dye, sheet, film, or the like. Such coatings may be transparent, translucent, or opaque. In some cases, the coatings are discontinuous and/or define regions along the cover member 132 having different optical properties. For example, a depth sensor window region 246 of the cover member 132 may have different optical properties (e.g., different materials, different optical properties, different layers, etc.) than an area outside and/or surrounding the depth sensor window region 246. For example, the sensor window region 246 may be more optically transmissive (e.g., to the particular wavelength(s) of light emitted by the depth sensor and/or detected by the depth sensor) than regions surrounding the sensor window region 246, which may be opaque.

The cover member 132 may define openings in which other protective elements may be positioned. For example, the cover member 132 defines a first opening 242 for the first camera module 202 and is configured to receive a first camera window 250 therein. The cover member 132 also defines a second opening 244 for the second camera module 204 and is configured to receive a second camera window 252 therein. The first and second camera windows 250, 252 may cover the first and second camera modules 202, 204, respectively, and may protect the camera modules 204, 206 (and their lenses) from scratches or other damage or contaminants. The first and second openings 242, 244 of the cover member 132 may be configured to surround flanges or raised rims that extend around the first and second openings 226, 228 of the frame member 224, and the first and second camera windows 250, 252 may be coupled to ledges or other features of the frame member 224 within the flanges or raised rims. Thus, in some cases, the exterior surface of the rear-facing sensor region 116 (in the area of the cameras, for example) may be defined by a portion of the cover member 132, a top surface of a flange or raised rim of the frame member 224, and a camera window 250, 252.

The cover member 132 may also define a third opening 248 for the flash module 208 and a fourth opening 254 for the microphone module 210. The flash window 236 may extend at least partially into the third opening 248 and may cover and/or protect the flash module 208 while allowing light from the flash module 208 to exit the device 100. A microphone screen 240 may be positioned at least partially in the fourth opening 254 to cover and/or protect the microphone module 210 while allowing sound to enter into the device 100 from outside of the device 100.

Figure 2B:
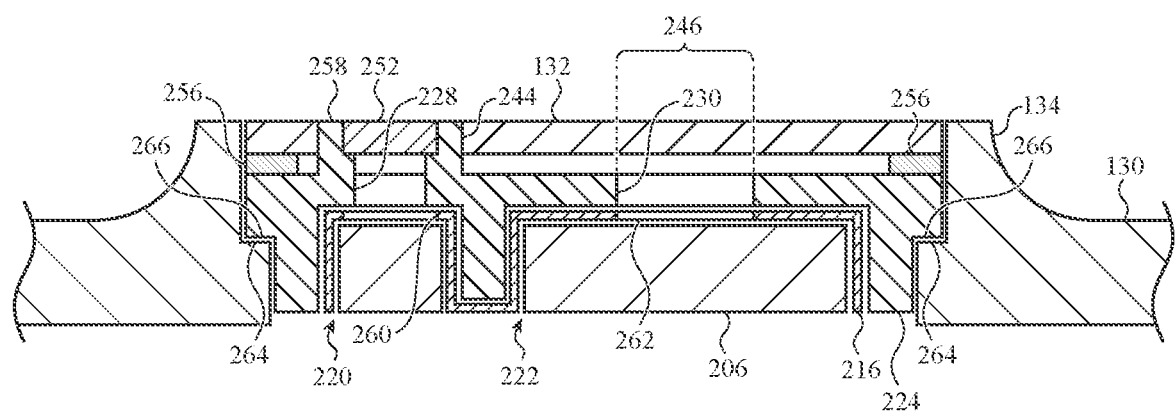
FIG. 2B depicts a partial cross-sectional view of a portion of an example electronic device.

FIG. 2B illustrates an example cross-sectional view of the device 100, viewed along line A-A in FIG. 1B. More particularly, FIG. 2B illustrates an example arrangement of a subset of the components associated with the rear-facing sensor region 116 shown and described with respect to FIG. 2A. Some of the components of the device 100 may be omitted from FIG. 2B for clarity.

FIG. 2B illustrates the raised rim 134 of the housing member 130. As shown, the housing member 130 may define a fillet or curved surface extending from the back surface of the housing member 130 to the raised rim 134. The raised rim 134 may surround and protect the side surfaces of the cover member 132. The top surface of the raised rim 134 (which may be planar) may be substantially flush with (or proud of) the top exterior surface of the cover member 132.

The frame member 224 may be attached to the housing member 130. For example, the housing member 130 may define a first support ledge 264, which may extend at least partially (and optionally completely) around the inner surface of the hole 200 in the housing member 130. The frame member 224 may define a second support ledge 266 that is configured to overlap and contact the first support ledge 264. In other cases, the frame member 224 lacks a distinct support ledge, and instead another portion of the frame member 224 rests on the first support ledge 264. The frame member 224 may be attached to the housing member 130 by inserting the frame member 224 into the hole 200 such that the second support ledge 266 rests on the first support ledge 264 (with or without interstitial layers such as adhesives, sealants, etc.), and then securing the frame member 224 to the housing member 130. Techniques for securing the frame member 224 to the housing member 130 are described herein with respect to FIGS. 3C-3F. The positioning of the frame member 224 relative to the housing member 130 may be defined by the position and locations of the first and second support ledges 264, 266.

The cover member 132 may be attached to the frame member 224 to retain the cover member 132 to the device 100. For example, the cover member 132 may be attached to the frame member 224 via an adhesive 256. Techniques for attaching the cover member 132 to the frame member 224 are described herein with respect to FIGS. 5A-5C.

FIG. 2B also illustrates how the frame member 224, the cover member 132, and the camera windows (e.g., the camera window 252) may be arranged. For example, the frame member 224 may define a raised rim 258, which may extend through an opening (e.g., the opening 244) in the cover member 132. The frame member 224 may also define a ledge within the raised rim 258 that supports the camera window 252. When assembled, the cover member 132, the top surface of the raised rim 258, and the camera window 252 may be substantially flush. In some cases, the raised rim 258 may be omitted, and the camera window 252 may be secured to the cover member 132 within the opening 244 (e.g., the camera window 252 may abut or be attached to the cover member 132 within the opening 244). In other cases, the cover member 132 may not have an opening for a separate camera window, but instead may include a transparent region above the camera.

FIG. 2B also illustrates example configurations of the second camera module 204 and the depth sensor module 206, as well as the arrangement of the bracket member 216 relative to the frame member 224. For example, the container portions of the bracket member 216 may be positioned in recesses, cavities, or other regions (defined by a network of ribs or flanges) of the frame member 224. As shown, the second camera module 204 is positioned in the second container portion 220, and is aligned with an opening 260 in the bracket member 216, the second opening 228 in the frame member, and the second opening 244 in the cover member 132 (and the camera window 252). Similarly, the depth sensor module 206 is positioned in the third container portion 222, and is aligned with an opening 262 in the bracket member 216, the third opening 230 in the frame member, and the depth sensor window region 246 of the cover member 132. As noted above, the depth sensor window region 246 may be a portion of the cover member 132 that has a different coating than another portion of the cover member 132 (or otherwise has optical properties that allow the depth sensor module 206 to transmit and/or receive light through the cover member 132).

Figure 3A:
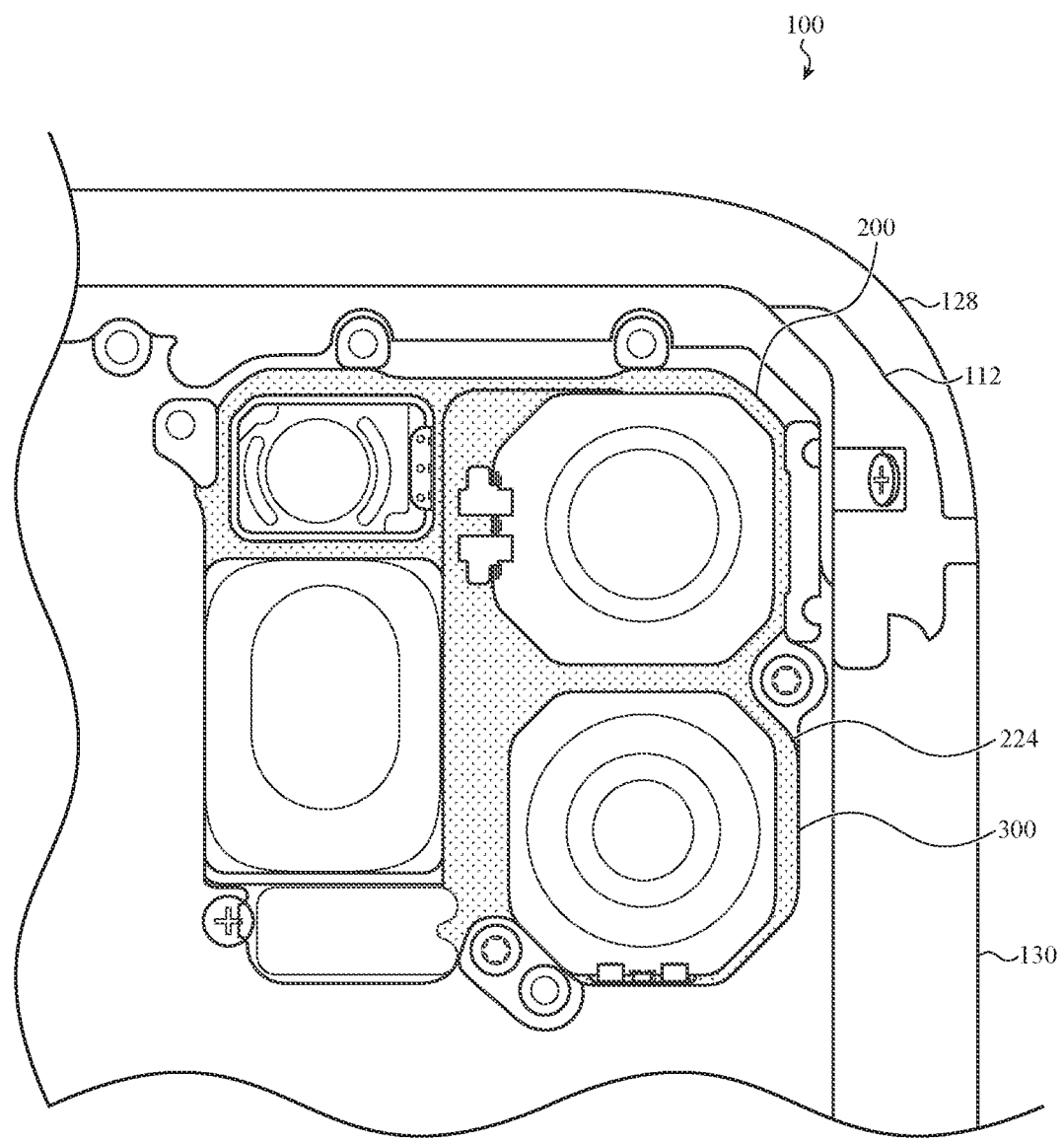
FIG. 3A depicts a portion of an example electronic device.
Figure 3B:
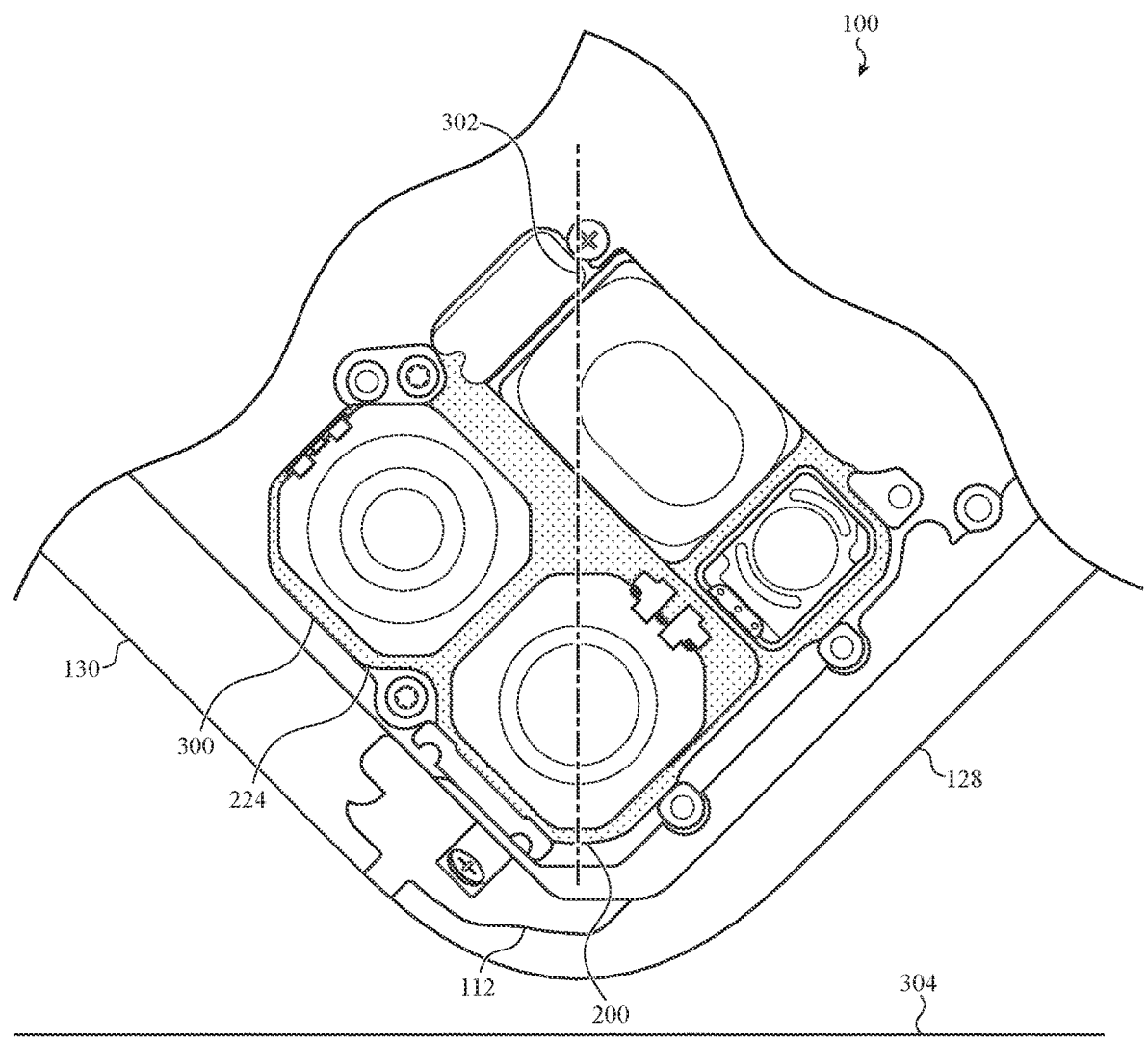
FIG. 3B depicts the electronic device of FIG. 3A impacting a surface.

FIGS. 3A-3B illustrate a portion of the housing 104 with the frame member 224 installed. (Other components are omitted from FIGS. 3A-3B.) As noted above, the frame member 224 may provide structural support to the housing of the device 100. For example, the hole 200 in the housing 104 may reduce the strength, stiffness, and/or overall structural soundness of the housing 104 in the area of the hole 200. Further, the area of the housing 104 where the hole 200 is positioned is proximate an area where a joint structure mechanically joins the housing member 130 with the housing member 128, which may be weaker than areas that are defined by uninterrupted metal materials.

These effects may be mitigated, however, by attaching the frame member 224 to the housing 104 in the hole 200. Further, the configuration of the frame member 224 may help direct forces from impacts, drop events, or the like. For example, the frame member 224 may define ribs 300 (indicated by the stippling pattern). The ribs 300 may define recesses or cavities along the back side (e.g., the interior-facing side) of the frame member 224. Components may be positioned in the recesses or cavities defined by the ribs 300, such as portions of the bracket member 216, camera modules, and the like. The ribs 300 may define load paths from the peripheral sides of the frame member 224 (e.g., the sides along the top and side of the device 100) to the main, central structural portion of the housing member 130. More broadly, the ribs 300 may help improve the stiffness and/or strength of the housing 104 in the area of the hole 200, as compared to a frame member 224 without ribs, or a housing that omits the frame member 224.

FIG. 3B illustrates how the ribs 300, and the frame member 224 more generally, improve the strength of the device 100 and/or its resistance to deformation or damage in the event of an impact. More particularly, FIG. 3B shows the device 100 at the moment of impact with a surface 304 (e.g., the ground). As shown, forces from the impact are transferred or directed from the point of impact (e.g., the corner of the device 100) through the ribs 300, and to the main body of the housing member 130. Load path 302 illustrates one example load path extending from the side of the housing 104 through the frame member 224 (though this is merely representative and is not intended to show the only load path). Stated another way, the ribs 300 provide a structural support to the housing member 130 in the area of the hole 200 to help prevent the housing member 130 from collapsing, bending, deforming, or otherwise being damaged due to impacts.

Figure 3C:
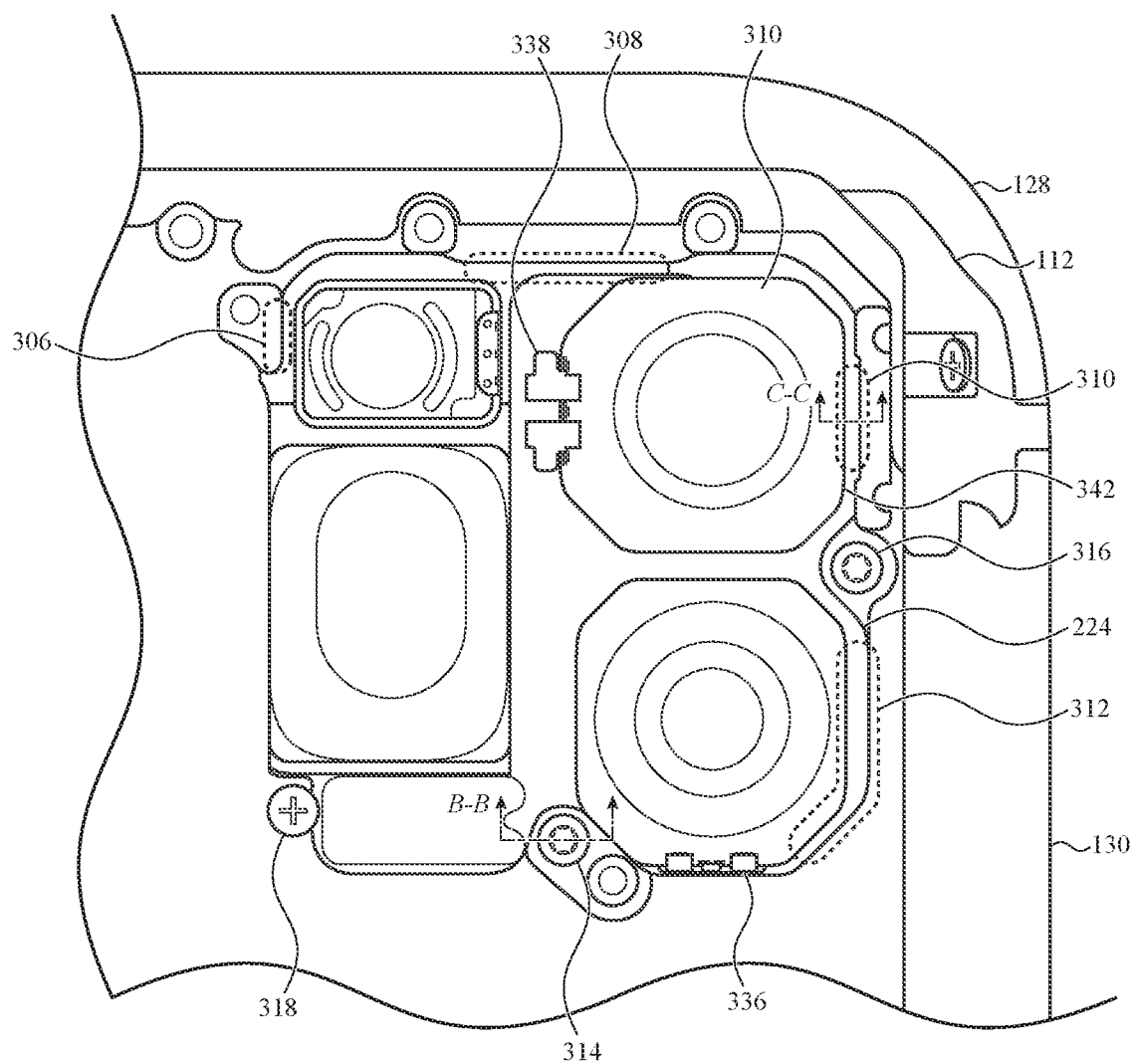
FIG. 3C depicts a portion of the electronic device of FIG. 3A.

In order for the frame member 224 to provide structural support to the housing 104, the frame member 224 may be securely attached to the housing. For example, the frame member 224 may be secured to the housing via welding, adhesives, fasteners, mechanical interlocks, or any other suitable technique. FIG. 3C illustrates a portion of the housing 104 with the frame member 224 installed, showing example techniques for securely attaching the frame member 224 to the housing 104. As shown in FIG. 3C, the frame member 224 may be attached to the housing 104 via welds and fasteners. For example, the frame member 224 may be welded (or soldered, brazed, or the like) to the housing member 130 at attachment locations 306, 308, 310, and 312 (among other possible locations). The frame member 224 may also be attached to the housing member 130 via fasteners 314, 316, and 318. The fasteners may be threaded fasteners, rivets, or any other suitable fastener.

Figure 3D:
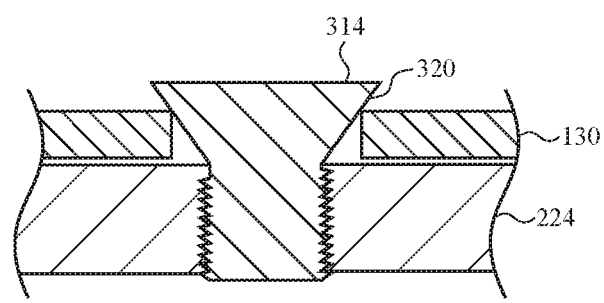
FIGS. 3D-3E depict partial cross-sectional views of the electronic device of FIG. 3A.

FIG. 3D is a partial cross-sectional view of the device 100, viewed along line B-B in FIG. 3C, showing how a fastener may secure the frame member 224 to the housing member 130. The fastener 314 may extend through a hole (e.g., a through-hole) in the housing member 130, and into a hole (e.g., a threaded hole) in the frame member 224. The fastener 314 may define a chamfered or angled surface 320 that is configured to contact the housing member 130 at the time of installation (and remain in contact with the housing member 130). By initiating contact between the chamfered surface 320 of the fastener 314 and the housing member 130 upon assembly, a load applied to the housing 104 (e.g., from a drop event) may be transferred through the fastener 314 immediately upon impact. By contrast, a conventional screw or bolt (e.g., with a cylindrical shaft portion) may result in a clearance or gap between the through hole in the housing member 130 and the screw or bolt. Upon an impact, the presence of the clearance or gap may allow the frame member 224 to shift relative to the housing member 130, thereby straining other connections between the frame member 224 and the housing (such as the weld joints) and otherwise reducing the structural integrity of the device.

Figure 3E:
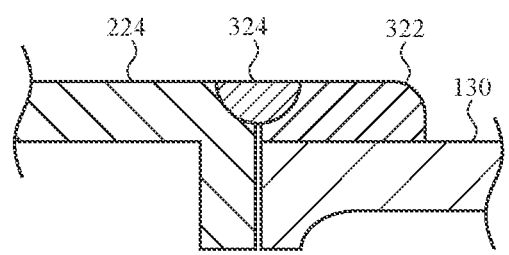

FIG. 3E is a partial cross-sectional view of the device 100, viewed along line C-C in FIG. 3C, showing how a weldment may be used to secure the frame member 224 to the housing member 130. In particular, the frame member 224 may be positioned proximate the housing member 130 and an optional weld bracket 322. The frame member 224 may be fastened to the weld bracket 322 via a weld bead 324. The weld bracket 322 may be attached to the frame member 224 via any suitable technique, such as welding, brazing, fusion bonding, soldering, adhesives, rivets, or the like. In some cases, the weld bracket 322 is part of the housing member 130, rather than being a separate component as shown in FIG. 3E (e.g., the weld bracket 322 and the housing member 130 may be part of a single unitary structure). While FIG. 3E illustrates a weld along a butt joint between the frame member 224 and the housing member 130, welds may also be applied to or used with other types of joints, such as lap joints, interlocks, or the like.

Figure 3F:
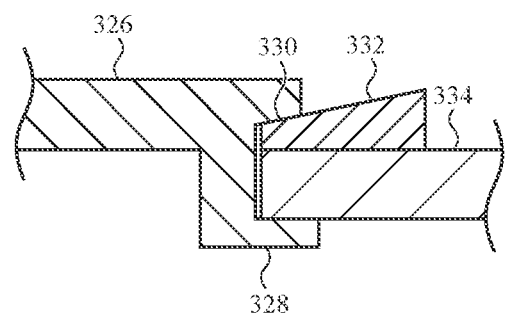
FIG. 3F depicts a partial cross-sectional view of another example electronic device.

FIG. 3F illustrates an attachment technique that may be used with an alternative frame member configuration. FIG. 3F is a partial cross-sectional view of a device, viewed along a line similar to line C-C in FIG. 3E. As shown in FIG. 3F, a frame member 326 may define a front flange 328 that is configured to engage an exterior surface of the housing member 334. The frame member 326 and the housing member 334 may be similar in other respects to the frame member 224 and the housing member 130, and for brevity details of those components will not be repeated here. The frame member 326 may also define an angled surface 330 that is configured to overlap at least a portion of the housing member 334. A wedge component 332 may be positioned between the angled surface 330 and the housing member 334. The wedge component 332 may force the frame member 326 upwards (relative to the orientation shown in FIG. 3F), thereby producing an engagement force between the front flange 328 and the exterior surface of the housing member 334 and tending to rigidly retain the frame member 326 to the housing member 334. The angle of the angled surface 330 and the wedge member 332 (as well as the materials and/or surface textures of the angled surface 330 and the wedge member 332) may be selected to produce a self-locking interface, in which downward forces applied to the frame member 326 (relative to the orientation shown in FIG. 3F) do not cause the wedge member 332 to be forced out of position (e.g., to the right as depicted in FIG. 3F). In some cases, the wedge member 332 is secured to the frame member 326 and/or the housing member 334, such as via welding, soldering, brazing, fasteners, adhesives, mechanical interlocks, or the like.

Figure 4A:
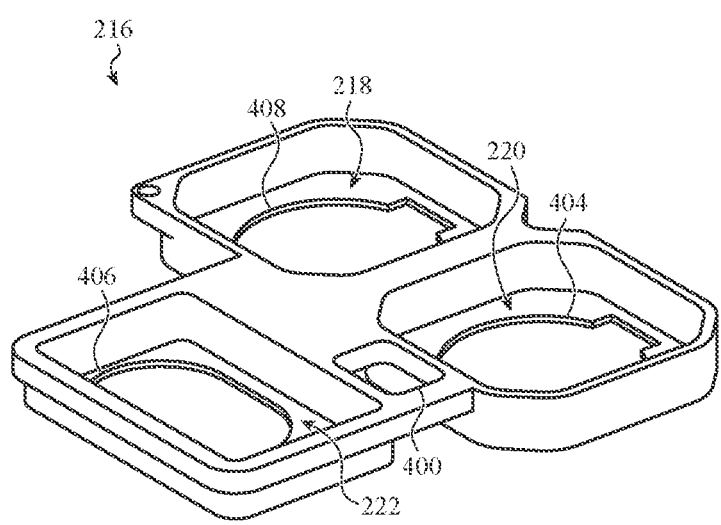
FIG. 4A depicts a component of an example electronic device.
Figure 4B:
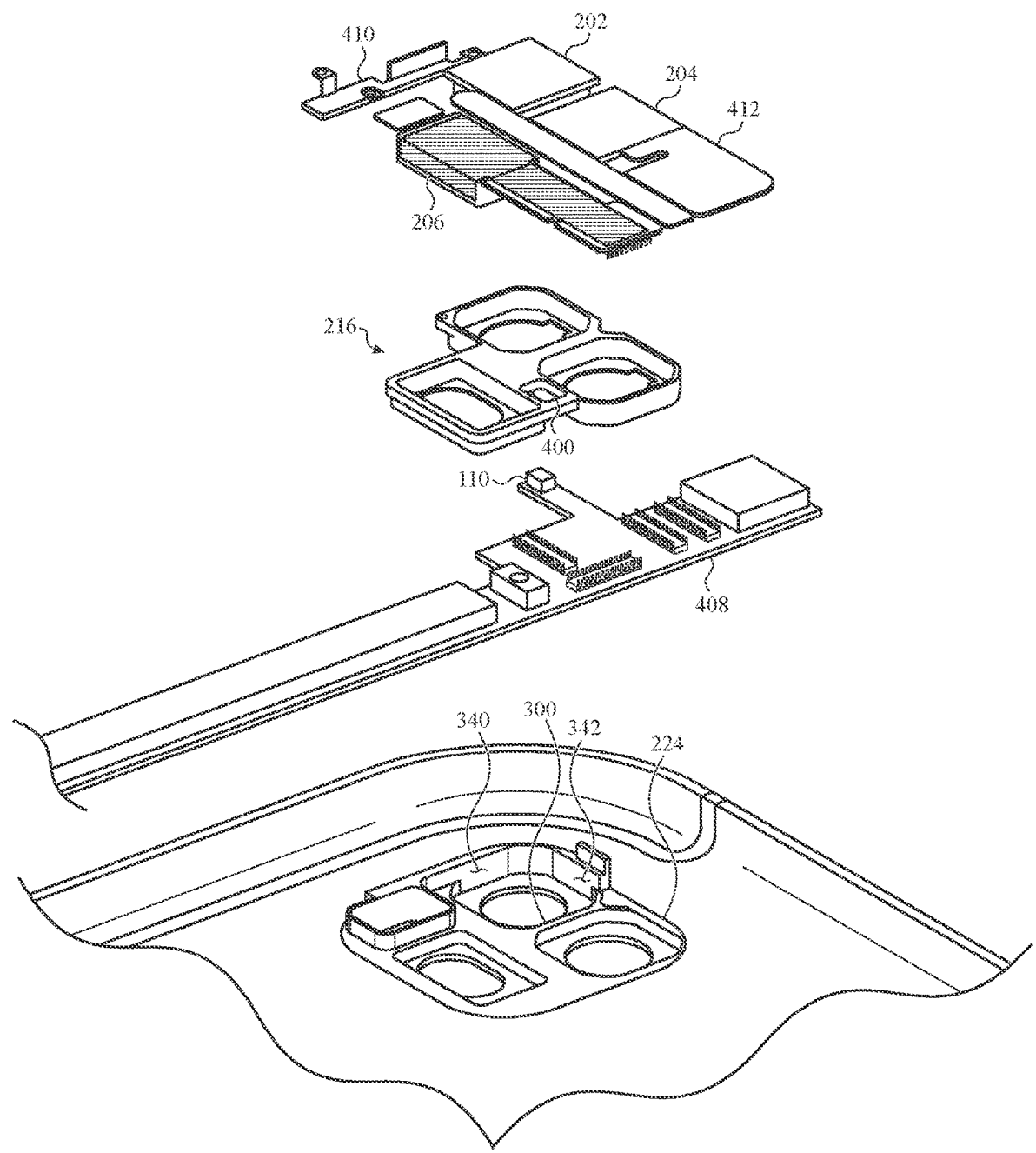
FIG. 4B depicts an exploded view of an example electronic device.
Figure 4C:
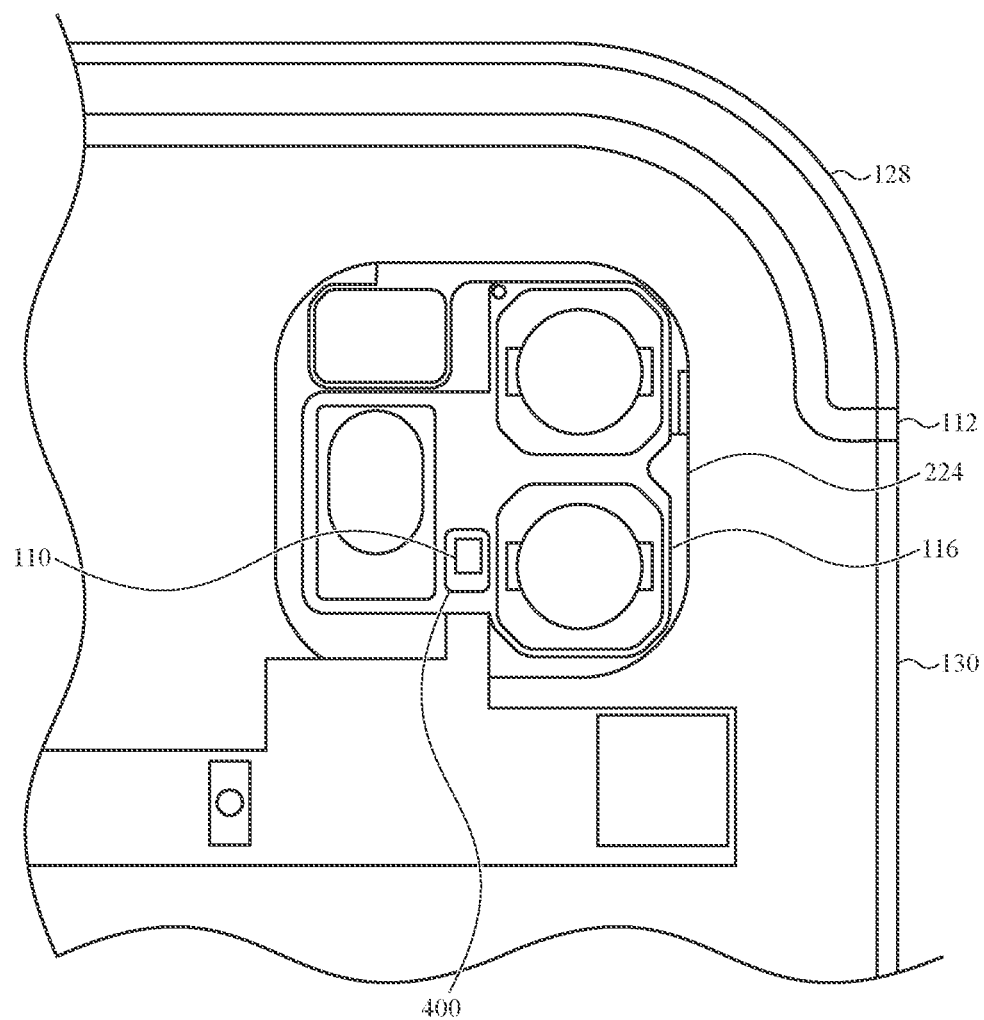
FIG. 4C depicts a portion of the electronic device of FIG. 4B.

FIGS. 4A-4C illustrate details of the bracket member 216 and its integration with the device 100. FIG. 4A, for example, depicts a perspective view of the bracket member 216. As described above, the bracket member 216 defines container portions 218, 220, 222 configured to receive the first and second camera modules 202, 204, and the depth sensor module 206. The bracket member 216 may also define openings 402, 404, 406 to allow the camera modules and the depth sensor module access to the external environment through the bracket member 216. The bracket member 216 may also define a sensor opening 400, which may be aligned with a sensor (e.g., the sensor 110). More particularly, the bracket member 216 may be positioned between the sensor 110 and the display of the device 100, and as such is in a position that may otherwise interfere with the sensing function of the sensor 110. The sensor opening 400 may allow the sensor 110 to sense objects that are proximate the display 103 and cover 102 of the device 100. For example, the sensor opening 400 may allow magnetic fields from a magnet of a cover accessory to reach the sensor 110 and allow the sensor 110 to detect the presence and/or absence of the magnetic field.

FIG. 4B is a partial exploded view of the device 100, showing the bracket member 216 removed decoupled from the device 100. As shown in FIG. 4B, the device 100 may include a circuit board 408, on which the sensor 110 may be positioned. The portion of the circuit board 408 with the sensor 110 may extend under the bracket member 216 such that the sensor 110 is positioned under the opening 400.

FIG. 4B also illustrates how the container portions of the bracket member 216 may nest in the corresponding container portions defined by the ribs 300 of the frame member 224, and also shows the first and second camera modules 202, 204 and the depth sensor module 206 above their respective container portions of the bracket member 216. As shown, the first and second camera modules 202, 204 and the depth sensor module 206 may be coupled to one or more circuit elements 412 (e.g., flexible circuit boards), which may include connectors that attach to the circuit board 408. A switch module 410 may also include a circuit element (e.g., a flexible circuit board) that extends over or integrates with the circuit elements of the first and second camera modules 202, 204 and the depth sensor module 206 and electrically couples to the circuit board 408.

FIG. 4C shows a portion of the device 100 with the bracket member 216 installed in the device. The first and second camera modules 202, 204 and the depth sensor module 206 are omitted for clarity.

Figure 5A:
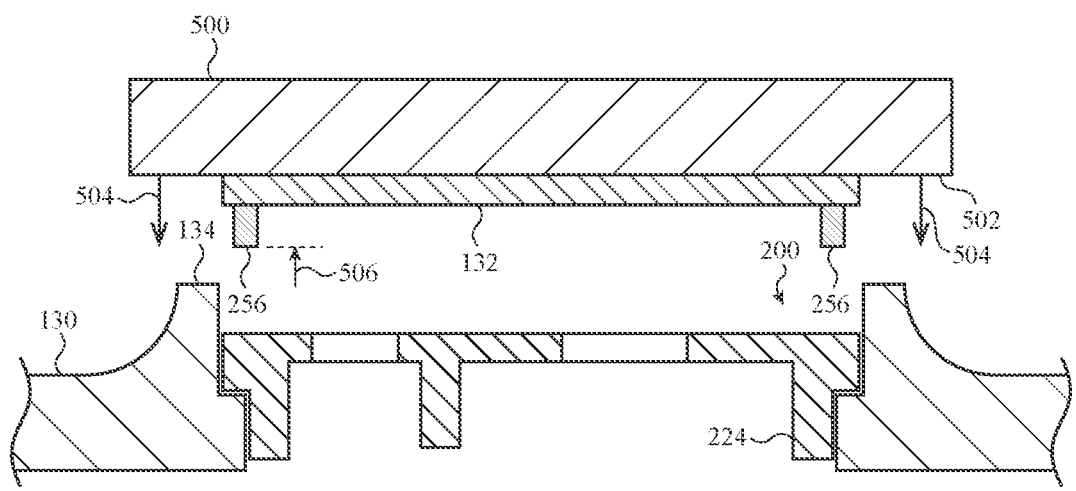
FIGS. 5A-5C depict partial cross-sectional views of an example electronic device.
Figure 5B:
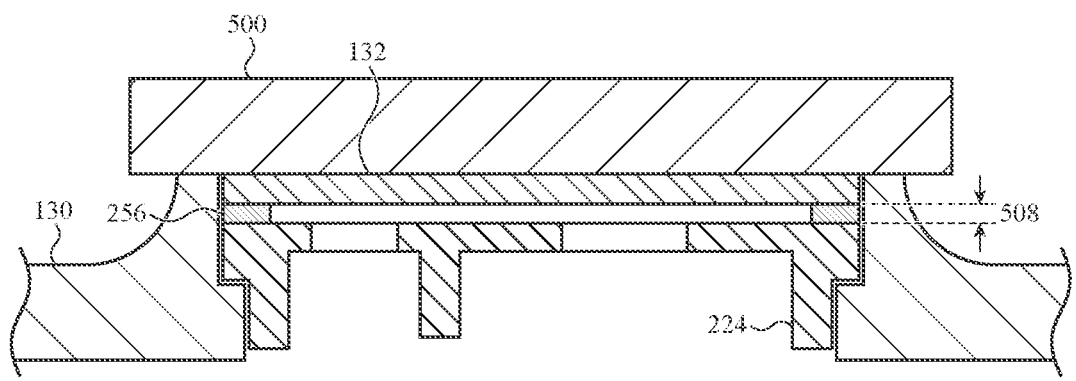

As described above, the cover member 132 may be attached to the device 100 by adhering the cover member 132 to the frame member 224. FIGS. 5A-5B illustrate an example process by which the cover member 132 may be attached to the frame member 224. In particular, the adhesive 256 may be deposited on a bottom surface of the cover member 132 (and/or onto a top surface of the frame member 224), and the cover member 132 may be pressed into the hole 200 and onto the top surface of the frame member 224 using a press 500. The press 500 may be heated, and may be used to heat the adhesive 256 before, during, and/or after the process of pressing the cover member 132 onto the frame member 224. For example, the adhesive 256 may be a heat activated adhesive, and the heat from the press 500 may cause the adhesive 256 to adhere to the cover member 132 and the frame member 224.

The press 500 may be configured to position the cover member 132 in the hole 200 so that the exterior surface of the cover member 132 is flush (e.g., to within 25 microns) with the top surface of the raised rim 134. For example, when the press 500 is moved downward (indicated by the arrows 504) and the cover member 132 is positioned in the hole 200, a bottom surface 502 of the press 500 (which is essentially flush with the exterior surface of the cover member 132) comes into contact with and is travel-limited by the top surface of the raised rim 134, as shown in FIG. 5B. At this point, the exterior surface of the cover member 132 is flush with the top surface of the raised rim 134. The adhesive 256 may be allowed to cure to retain the cover member 132 in this position.

Figure 5C:
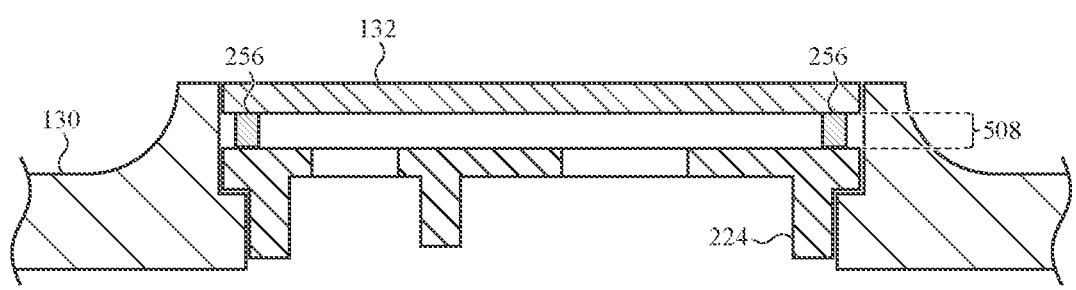

Due to manufacturing and material variabilities, the distance between the top surface of the frame member 224 and the top surface of the raised rim 134 may vary between different devices. Accordingly, the structure of the device 100 and the process described with respect to FIGS. 5A-5C are configured to accommodate such dimensional differences while still consistently producing devices in which the cover member 132 is flush with the raised rim 134. This may be accomplished, for example, by providing a sufficient amount of adhesive 256 to accommodate different sized gaps between the top of the frame member 224 and the bottom of the cover member 132 (when the top of the cover member 132 is flush with the raised rim 134). FIG. 5A illustrates the adhesive 256 having a thickness 506. When the cover member 132 is positioned in place by the press 500, as shown in FIG. 5B, the adhesive 256 is compressed somewhat (e.g., to thickness 508, matching the gap between the cover member 132 and the frame member 224), ensuring that the adhesive 256 makes intimate contact with the surface of the frame member 224. This process also results in the adhesive 256 flowing or expanding laterally a certain amount, as defined by the amount of the adhesive 256 and the actual gap between the components.

In cases where the gap between the cover member 132 and the frame member 224 is greater than or less than that shown in FIG. 5B, the adhesive 256 may flow laterally by different amounts in order to accommodate the different gap sizes. FIG. 5C, for example, shows an example in which the housing 130, frame member 224, and cover member 132 result in a gap size of 510 (larger than the gap in FIG. 5B). Due to the ability of the adhesive 256 to flow laterally, along with the initial height 506 of the adhesive 256 being greater than the gap size 510, the adhesive 256 can successfully secure the cover member 132 to the frame member 224 despite the different gap size and while still positioning the cover member 132 so that the exterior surface of the cover member 132 is flush with the top surface of the raised rim 134. In cases where the gap size is smaller than that shown in FIG. 5B, the adhesive 256 may flow laterally more than shown in FIG. 5B. Furthermore, other types of irregularities may also be accommodated using this assembly technique. For example, variations in a flatness of the cover member 132, the frame member 224, the ledges of the frame member 224, and/or the ledges of the housing member 130 may result in a non-uniform gap size between the cover member 132 and the frame member 224. The ability of the adhesive to flow (as well as the attachment process using the raised rim 134 as a datum for the positioning of the cover member 132) allows the non-uniform gap sizes to be accommodated while maintaining the flushness of the cover member 132 and the raised rim 134.

The height 506 of the adhesive 256 may be selected to accommodate a range of potential gap sizes. For example, the height 506 may be about 100 microns, about 150 microns, about 200 microns, about 250 microns, or any other suitable height. In some cases, the particular height of adhesive may be selected based on one or more measurements of the components of the device 100. For example, before application of the adhesive 256 to the cover member 132, components such as the cover member 132, the frame member 224, and/or the housing member 130 may be measured (either in an unassembled or partially assembled state). Based on the measurement, if a gap between the cover member 132 and the frame member 224 is measured or estimated to be greater than a threshold value, a first thickness of adhesive is applied (e.g., about 200 microns), and if it is measured or estimated to be less than a threshold value, a second thickness of adhesive is applied (e.g., about 150 microns). Other thicknesses are also contemplated.

Figure 7A:
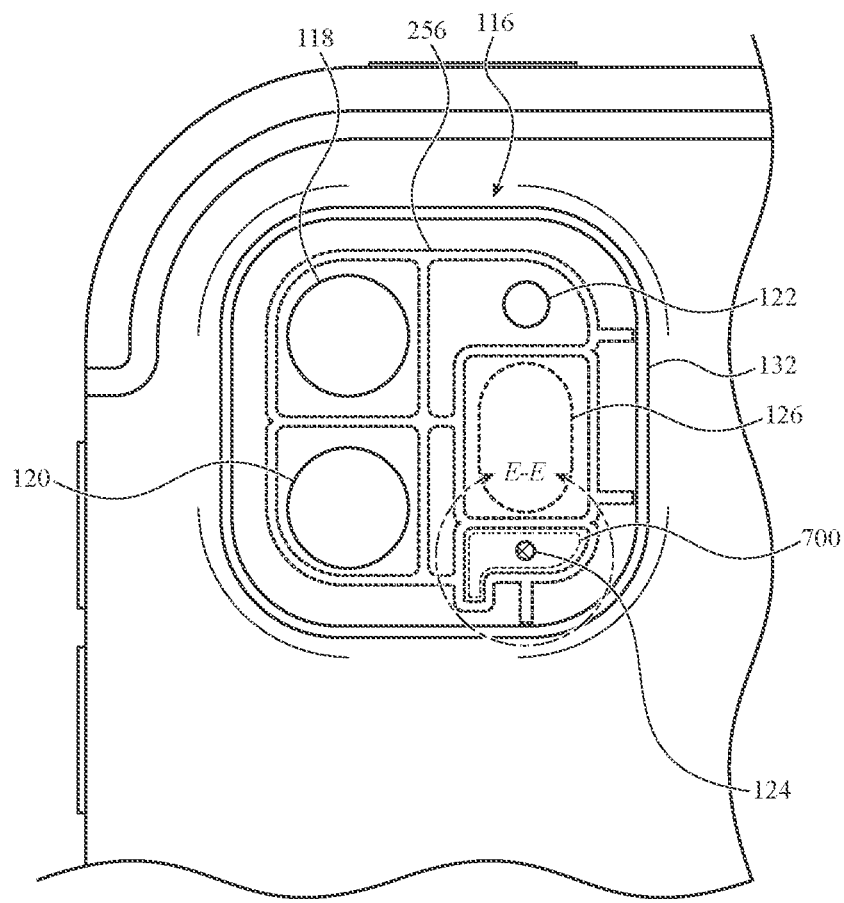
FIG. 7A depicts a portion of an example electronic device.

While FIGS. 5A-5C illustrate adhesive around the perimeter of the bottom surface of the cover member 132, this is merely one configuration or positioning of the adhesive. For example, in some cases the adhesive 256 may be deposited in a web-like or other pattern more complex than simply a single path around an outer perimeter. For example, FIG. 7A illustrates an adhesive application pattern that may be used to secure the cover member 132 to the frame member 224.

In compact electronic devices, such as tablet computers, the close proximity of various electrical components may require shielding and other techniques to mitigate or eliminate the effects of electrical noise or other interference on various systems. A depth sensor module 206, for example, may include a high-frequency oscillator that may produce electromagnetic noise that may interfere with other electronics or circuits of the device 100. Accordingly, the depth sensor module 206 may be shielded and/or grounded to help reduce or mitigate the negative effects of the noise.

Figure 6A:
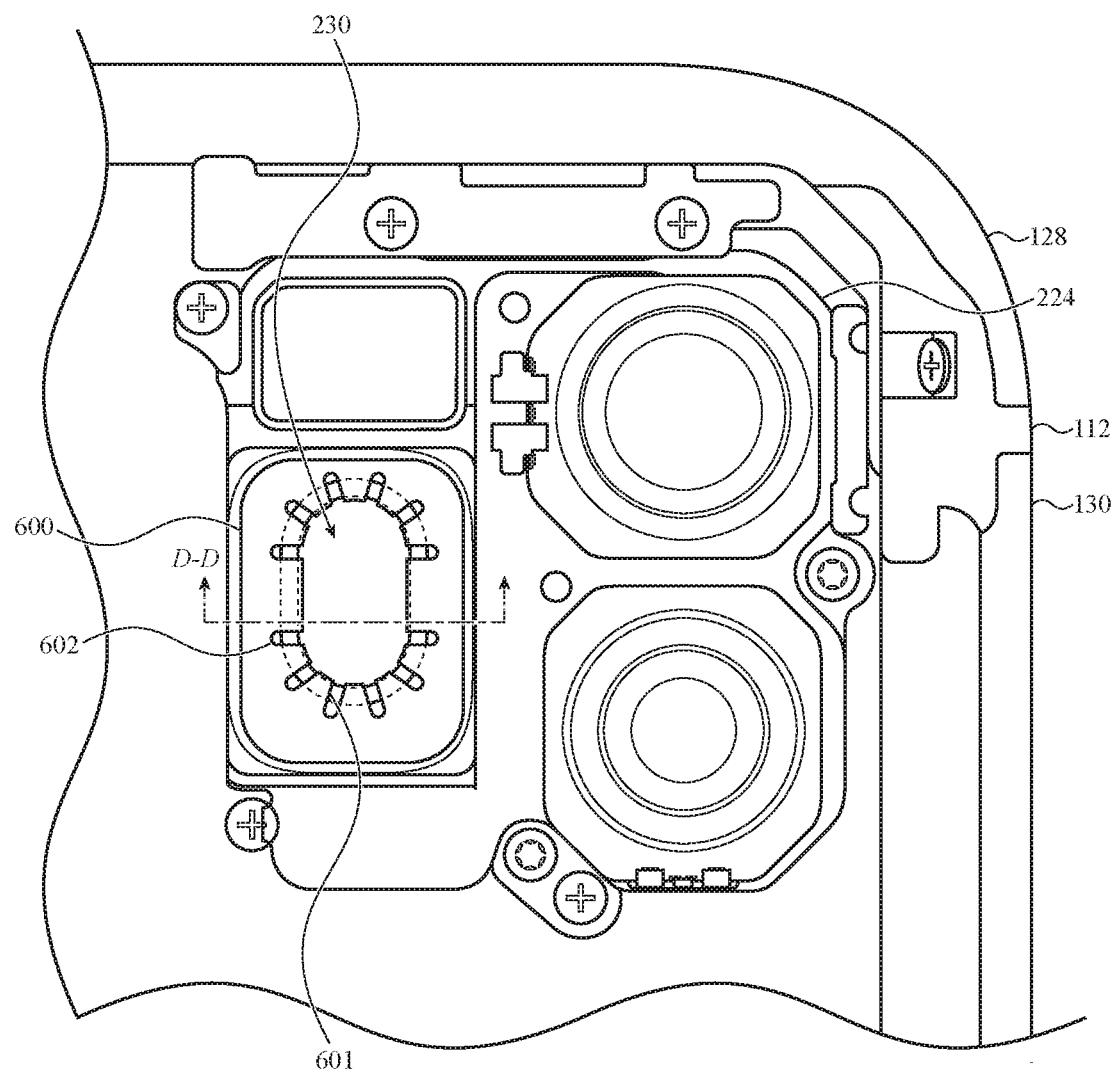
FIG. 6A depicts a portion of an example electronic device.
Figure 6B:
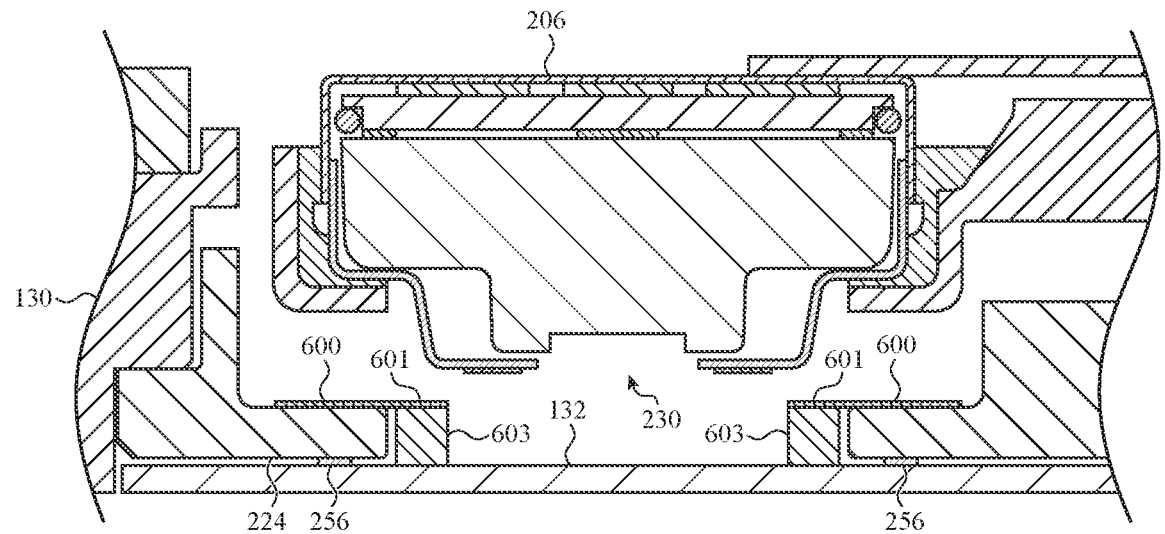
FIGS. 6B-6C depict partial cross-sectional views of the electronic device of FIG. 6A.
Figure 6C:
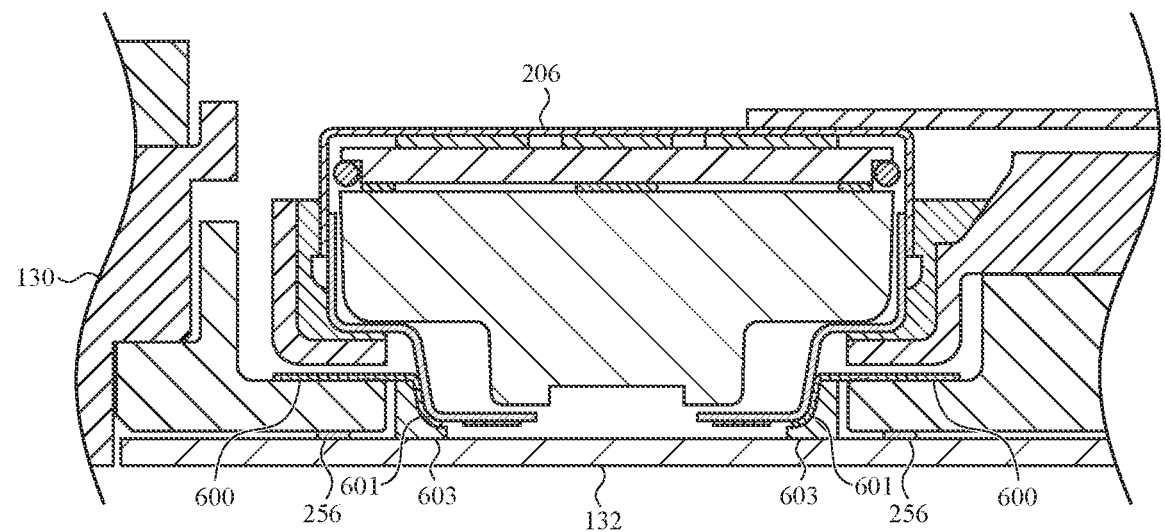

FIGS. 6A-6C illustrate an example technique for effectively shielding and grounding the depth sensor module 206. FIG. 6A, for example, illustrates a partial view of the device 100, showing the housing with the frame member 224 installed in the housing member 130. The device 100 may include a conductive cowling 600 coupled to the frame member 224. The cowling 600 is formed from a conductive material, such as a copper, gold, or other flexible metal foil or film. The cowling 600 defines an opening that is aligned with or otherwise coincides with the opening 230 in the frame member 224 and which is configured to allow the depth sensor module 206 access to the exterior environment. The cowling 600 may be configured to contact and conductively couple to a housing of the depth sensor module 206 as well as to the frame member 224 (which may be conductively coupled to a ground plane of the device 100). Thus, the cowling 600 defines a conductive path from the depth sensor module 206 to an electrical ground, thereby helping prevent interference from the depth sensor module 206 from affecting other circuits or components of the device 100.

As shown with respect to FIGS. 6B-6C, when the depth sensor module 206 is coupled to the device 100, it may be forced against the cowling 600 such that the cowling 600 deforms. The cowling 600 may define a series of conductive tabs 601 separated from one another by spaces 602. The tabs 601 may facilitate the cowling 600 deforming to conform against the depth sensor module 206 as the depth sensor module 206 is installed, while helping prevent and/or avoid buckling, curling, or other unwanted deformations that may distort the cowling 600 in a manner that may be detrimental to the function of the cowling 600.

FIG. 6B is a partial cross-sectional view of the device 100, viewed along line D-D in FIG. 6A, showing the depth sensor module 206 prior to installation in the device 100. FIG. 6B shows the cowling 600 attached to the frame member 224 along a surface around the opening 230 in the frame member 224. The cowling 600 may be conductively coupled to the frame member 224 in this area via conductive adhesive, brazing, soldering, or any other technique that retains the cowling 600 to the frame member 224 and facilitates a conductive coupling between these components. A foam 603 (or other compliant material) may be positioned between the cowling 600 and the cover member 132 (e.g., below the tabs 601 that extend over and/or into the opening). The foam 603 may be configured to deform when the depth sensor module 206 is put into position in the device and to provide a biasing force between the tabs 601 and the depth sensor module 206 (e.g., to bias the tabs 601 against the depth sensor module 206, thereby maintaining a physical and conductive coupling between the tabs 601 and the depth sensor module 206).

FIG. 6C is a partial cross-sectional view of the device 100, viewed along line D-D in FIG. 6A, showing the depth sensor module 206 after installation in the device 100. As shown, the cowling 600 has deformed (e.g., the tabs 601 of the cowling 600), as has the foam 603. The tabs 601 have conformed to the contour of the depth sensor module 206, and the foam 603 helps define the contour and maintain the tabs 601 in conformance and contact with the depth sensor module 206.

Figure 6D:
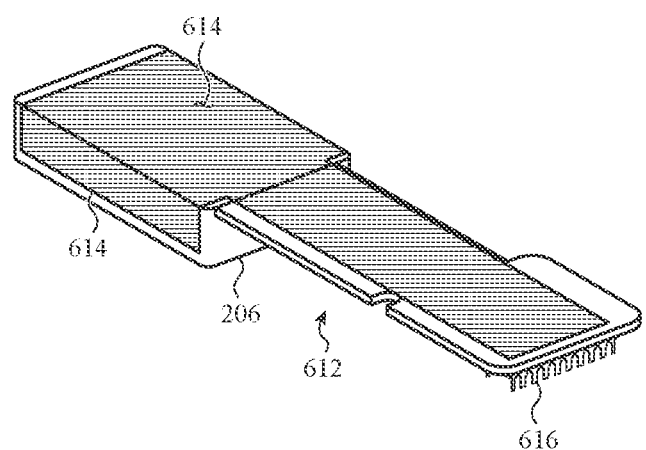
FIG. 6D depicts a component of an electronic device.

FIG. 6D is a perspective view of the depth sensor module 206, showing additional components that may be used to shield the depth sensor module 206. In particular, a flexible conductive material 614 (e.g., a copper tape) may be wrapped around at least a portion of the depth sensor module 206, such as around at least two sides of the depth sensor module 206. The conductive material 614 may also extend over a top of the depth sensor module 206 and along the top surface of a flexible circuit element 612 that interconnects the depth sensor module 206 with other circuit elements of the device (e.g., via a connector 616). The conductive material 614 may be conductively coupled to a ground plane of the device 100 to facilitate the shielding function of the conductive material 614.

As noted above, the cover member 132 may be attached to the frame member 224 using an adhesive 256. The adhesive 256 may be arranged in a pattern that provides a large surface area for the adhesive 256 to bond to, both on the cover member 132 and the frame member 224. FIG. 7A illustrates a portion of the device 100 that includes the rear-facing sensor region 116, illustrating an example application pattern for the adhesive 256. As shown, the adhesive 256 at least partially surrounds the various components of the rear-facing sensor region 116. For example, the adhesive 256 extends around the first camera 118, the second camera 120, the flash 122, the depth sensor 126, and the microphone 124. By depositing the adhesive 256 in this way, the cover member 132 may be securely attached to the device 100.

Figure 7B:
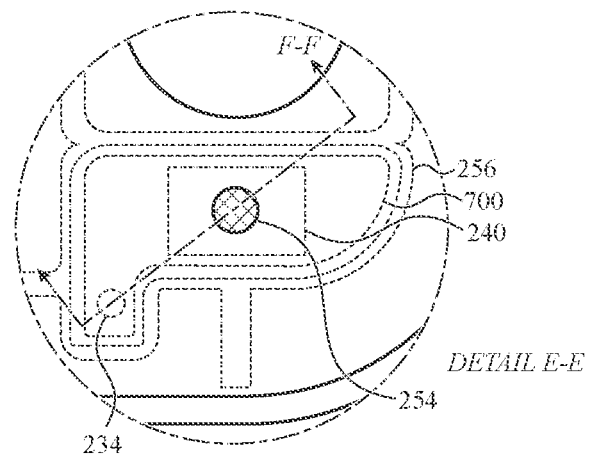
FIG. 7B depicts a detail view of the electronic device of FIG. 7A.

The adhesive 256 may perform other functions in addition to securing the cover member 132 to the frame member 224. For example, the adhesive 256 may surround the microphone 124 (or an area associated with the microphone 124) to help define a sealed audio path extending from the exterior environment to the microphone module within the device 100. FIG. 7B illustrates a detail view of the rear-facing sensor region 116 corresponding to area E-E in FIG. 7A. FIG. 7B illustrates the pattern of the adhesive 256 around the microphone region. FIG. 7B also shows a boundary of a recess 700 that is formed in the frame member 224 and that forms part of the acoustic path leading from the opening 254 in the cover member 132 to the opening 234 in the frame member 224. Notably, the opening 254 is offset from (e.g., is not coaxial with) the opening 234. Accordingly, as described with respect to FIG. 7C, the acoustic path from the exterior environment to the microphone module 210 may be non-linear and may pass through a chamber or volume defined between the cover member 132 and the frame member 224 (with the path including the recess 700 of the frame member 224). FIG. 7B also illustrates the outer boundary of the microphone screen 240 that may cover the opening 254 in the cover member 132.

Figure 7C:
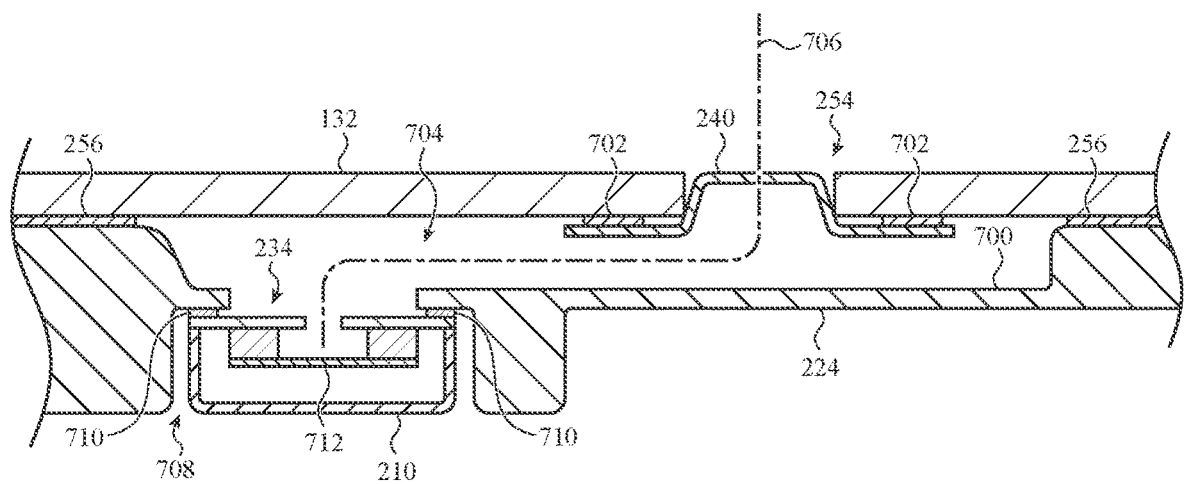
FIG. 7C depicts a partial cross-sectional view of the electronic device of FIG. 7A.

FIG. 7C is a partial cross-sectional view of the device 100, viewed along line F-F in FIG. 7B. As shown, an acoustic path 706 is defined from the exterior of the device 100 to the diaphragm 712 (or other sensing element) of the microphone module 210 (which may be positioned in a recess 708 defined by the frame member 224). The acoustic path 706 extends through a volume 704 defined in part by the recess 700 and the cover member 132. The acoustic path 706 also extends through the microphone screen 240, which may be positioned in the opening 254 of the cover member 132. The microphone screen 240 may be attached to the cover member 132 with an adhesive 702, and may define a deformed portion that extends into the opening 254 and defines an exterior portion that is flush with the exterior surface of the cover member 132 (though in some embodiments it may be recessed or proud relative to the exterior surface of the cover member 132).

The volume through which the acoustic path 706 extends may be a sealed or enclosed volume, with the exception of the opening 254 in the cover member 132. For example, the adhesive 256 that attaches the cover member 132 to the frame member 224 may extend around the perimeter of the recess 700, as shown in FIG. 7B, thereby enclosing and/or sealing the volume 704 from other environments (e.g., the exterior environment and the internal volume of the device 100). Similarly, the microphone module 210 may be attached to the frame member 224 via an adhesive 710 (e.g., a pressure-sensitive adhesive), which may extend around the opening 234 in the frame member 224 to enclose and/or seal the joint between the microphone module 210 and the frame member 224. By sealing the volume through which the acoustic path 706 extends, interference from both internal and external sources of audible interference may be avoided. In some cases, the sealing provided by the adhesives 256 and 710 is a watertight seal and/or a hermetic seal.

As noted above, the frame member 224 may include a coating, such as a DLC coating, along at least the outward-facing surfaces of the frame member 224 (e.g., the top surfaces as depicted in FIG. 7C). In some cases, the surface of the recess 700 lacks the coating. For example, a coating such as a DLC coating may be applied to the frame member 224 after the recess 700 is formed in the frame member 224 (e.g., by machining). The DLC coating may then be locally removed from areas of the frame member 224, such as from the surface of the recess 700, areas where adhesive is applied to the frame member 224, or the like.

Figure 8A:
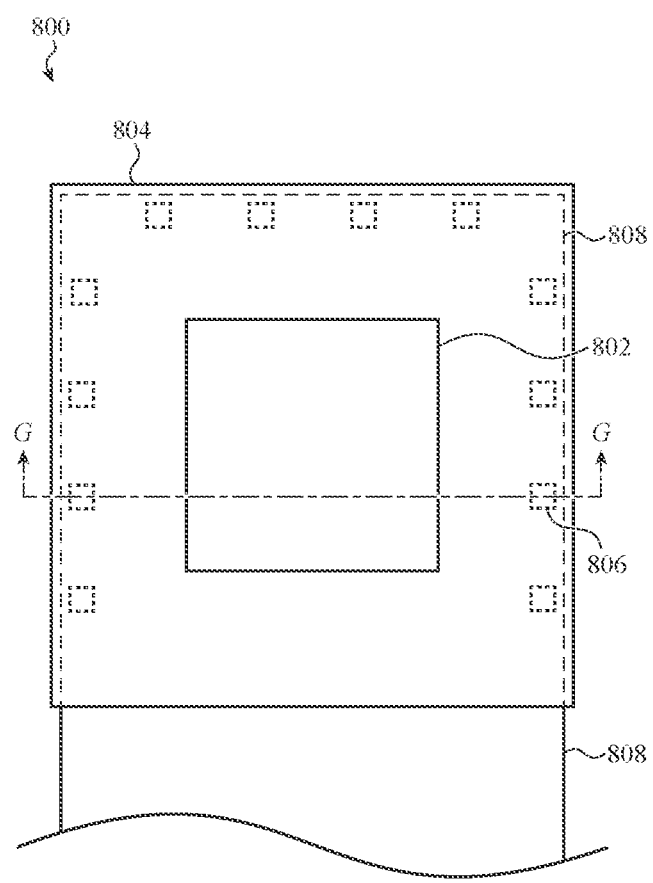
FIG. 8A depicts an example sensor component for an electronic device.

FIG. 8A is a top view of an example optical sensor assembly 800 that may be used for the depth sensor 126. The sensor assembly 800 may include an optical sensor 802 (e.g., a charge coupled device (CCD) sensor, a complementary metal oxide semiconductor (CMOS) sensor, or any other suitable type of sensor. The optical sensor 802 may be attached to a substrate 804, and may be conductively coupled (through the substrate 804) to one or more connection pads, such as connection pad 806. The sensor assembly 800 may also include a flexible circuit board 808, which may include connection pads that conductively couple to the connection pads on the substrate 804, as well as conductive traces that facilitate conductive coupling between the sensor 802 and other components.

Figure 8B:
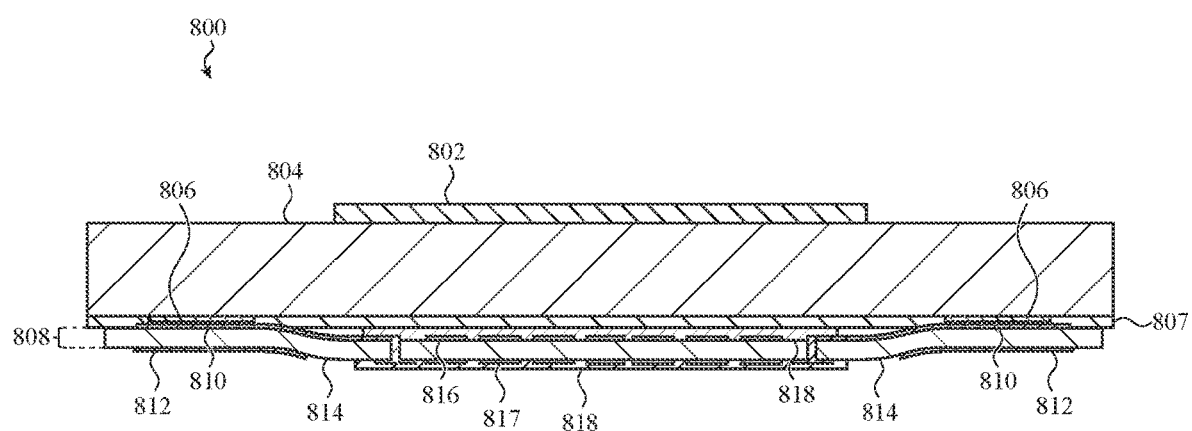
FIGS. 8B-8D depict partial cross-sectional views of a sensor component for an electronic device.

FIG. 8B is a partial cross-sectional view of the optical sensor assembly 800, viewed along line G-G in FIG. 8A. The flexible circuit board 808 may include a flexible substrate 814 (which may include one or more sub-layers, such as one or more polyimide sheets, adhesive layers, and the like). The flexible circuit board 808 may also include connection pads 810 that are exposed along the top surface of the flexible circuit board 808 and are configured to be conductively coupled to the connection pads (e.g., the connection pad 806) of the substrate 804. The flexible circuit board 808 may also include components 816 (e.g., electrical traces, connection pads, circuit elements, or other components) that are coupled to a surface of the flexible circuit board 808 but are not intended to be conductively coupled to the substrate 804. Accordingly, such components 816 may be covered by a coverlay 818, which may protect and electrically insulate the components 816.

The flexible circuit board 808 may be coupled to the substrate 804 using a conductive adhesive 807, such as an anisotropic conductive film. The conductive adhesive 807 may both bond the flexible circuit board 808 to the substrate 804, and also conductively couple the connection pads 806 to the connection pads 810.

In some cases, the coverlay 818 on the top surface of the flexible circuit board 808 may cause the flexible circuit board 808 to bend or deform when the flexible circuit board 808 is coupled to the substrate 804. FIG. 8B illustrates such a condition, where the flexible circuit board 808 has deformed in the areas around the coverlay 818 to accommodate the extra thickness of the coverlay 818 on the top surface. This configuration may strain the flexible circuit board 808 as well as the adhesive joints between the connection pads 806 and the connection pads 810.

Figure 8C:
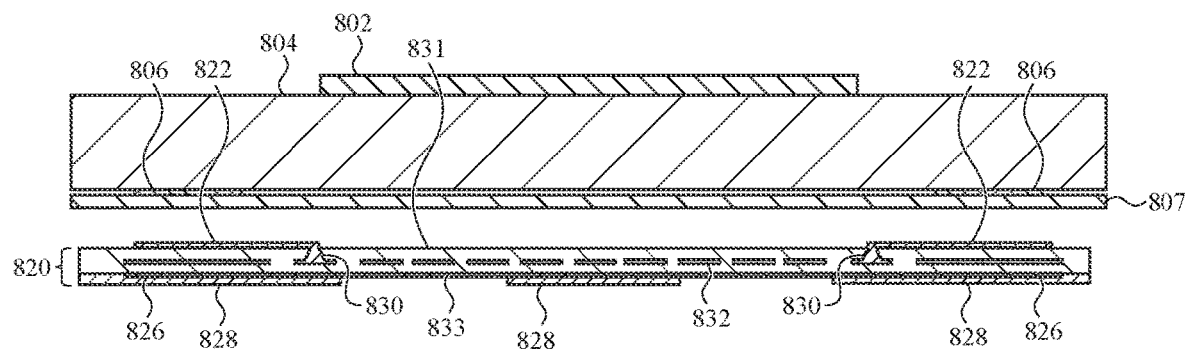
Figure 8D:
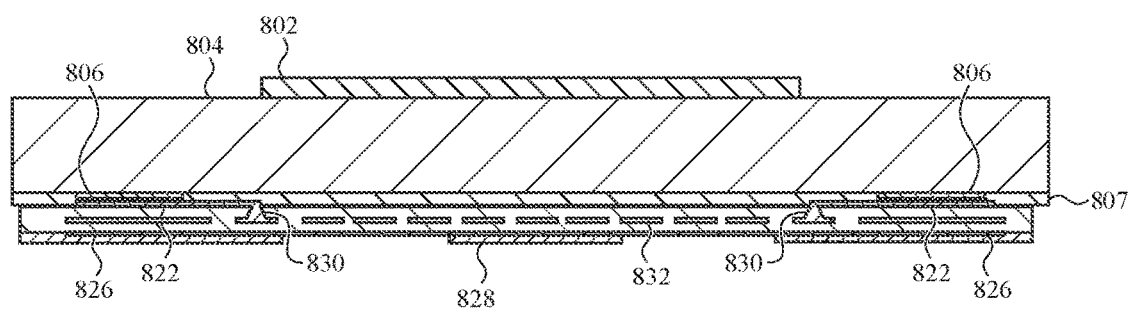

FIGS. 8C-8D are partial cross-sectional views the optical sensor assembly 800 using a different flexible circuit board configuration. In particular, instead of mounting components 816 on the top exterior surface of a flexible substrate 814, and then applying a coverlay 818 over the components 816 (which adds additional height to the flexible circuit board in the area of the coverlay), FIGS. 8C-8D show a flexible circuit board 820 in which components 832 are sandwiched between multiple substrate layers of the flexible circuit board 820.

FIG. 8C shows the flexible circuit board 820 prior to being attached to the substrate 804. As shown, the flexible circuit board 820 includes components 832 (e.g., electrical traces, connection pads, circuit elements, or other components) between a first substrate layer 831 and a second substrate layer 833. The first and second substrate layers may be polyimide layers that are adhered together after positioning the components 832 therebetween. Connection pads 822 may be exposed on a top surface of the flexible circuit board 820 so they can be conductively coupled to the connection pads 806 on the substrate 804. The flexible circuit board 820 may also include vias 830 to conductively couple the external connection pads 822 to other traces, circuit elements, or other components that are between the first and second substrate layers 831, 833, or on the bottom surface of the flexible circuit board 820. The flexible circuit board 820 may also include components 826 (e.g., electrical traces, connection pads, circuit elements, or other components) on the bottom surface of the flexible circuit board 820, portions of which may be covered by a coverlay 828 (e.g., to protect and/or electrically insulate the components 826).

The configuration of the flexible circuit board 820 results in a top side that is significantly flatter than the flexible circuit board 808 in FIG. 8B. In particular, by using multiple laminations and positioning components between the laminations (instead of on top of the flexible substrates), the need for an exterior coverlay on the top surface can be eliminated. FIG. 8D illustrates the optical sensor assembly 800 with the flexible circuit board 820 attached. As shown, the conductive adhesive 807 bonds the flexible circuit board 820 to the substrate 804, and also conductively couples the connection pads 822 to the connection pads 810. Unlike the flexible circuit board 808 in FIG. 8B, however, the flexible circuit board 820 does not significantly deform, flex, or bend when attached to the substrate 804. Rather, the flexible circuit board 820 remains substantially flat and/or undeformed, thereby resulting in a less strained flexible circuit board 820 and reducing the likelihood of delamination, breaking, or other potential damage.

Figure 9:
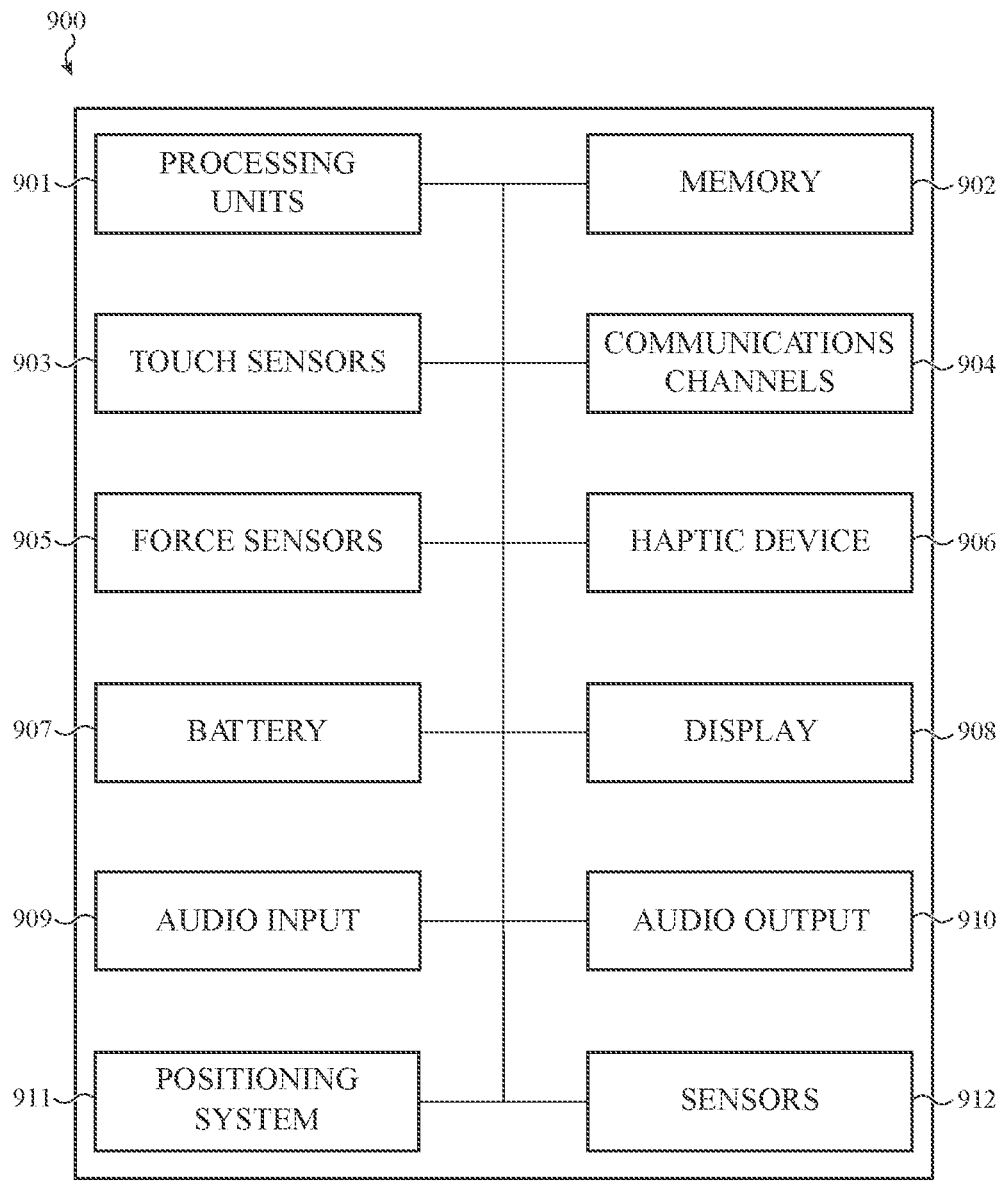
FIG. 9 depicts a schematic diagram of an example electronic device.

FIG. 9 depicts an example schematic diagram of an electronic device 900. The electronic device 900 may be an embodiment of or otherwise represent the device 100 (or any other device(s) described herein). The device 900 includes one or more processing units 901 that are configured to access a memory 902 having instructions stored thereon. The instructions or computer programs may be configured to perform one or more of the operations or functions described with respect to the electronic devices described herein. For example, the instructions may be configured to control or coordinate the operation of one or more displays 908, one or more touch sensors 903, one or more force sensors 905, one or more communication channels 904, one or more audio input systems 909, one or more audio output systems 910, one or more positioning systems 911, one or more sensors 912, and/or one or more haptic feedback devices 906.

The processing units 901 of FIG. 9 may be implemented as any electronic device capable of processing, receiving, or transmitting data or instructions. For example, the processing units 901 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 901 may be coupled to a circuit board, such as the circuit board 408 (FIG. 4B), or a different circuit board.

The memory 902 can store electronic data that can be used by the device 900. For example, a memory can store electrical data or content such as, for example, audio and video files, images, documents and applications, device settings and user preferences, programs, instructions, timing and control signals or data for the various modules, data structures or databases, and so on. The memory 902 can be configured as any type of memory. By way of example only, the memory can be implemented as random access memory, read-only memory, Flash memory, removable memory, or other types of storage elements, or combinations of such devices.

The touch sensors 903 may detect various types of touch-based inputs and generate signals or data that are able to be accessed using processor instructions. The touch sensors 903 may use any suitable components and may rely on any suitable phenomena to detect physical inputs. For example, the touch sensors 903 may be capacitive touch sensors, resistive touch sensors, acoustic wave sensors, or the like. The touch sensors 903 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The touch sensors 903 may be integrated with or otherwise configured to detect touch inputs applied to any portion of the device 900. For example, the touch sensors 903 may be configured to detect touch inputs applied to any portion of the device 900 that includes a display (and may be integrated with a display). The touch sensors 903 may operate in conjunction with the force sensors 905 to generate signals or data in response to touch inputs. A touch sensor or force sensor that is positioned over a display surface or otherwise integrated with a display may be referred to herein as a touch-sensitive display, force-sensitive display, or touchscreen.

The force sensors 905 may detect various types of force-based inputs and generate signals or data that are able to be accessed using processor instructions. The force sensors 905 may use any suitable components and may rely on any suitable phenomena to detect physical inputs. For example, the force sensors 905 may be strain-based sensors, piezoelectric-based sensors, piezoresistive-based sensors, capacitive sensors, resistive sensors, or the like. The force sensors 905 may include any suitable components for detecting force-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The force sensors 905 may be used in conjunction with various input mechanisms to detect various types of inputs. For example, the force sensors 905 may be used to detect presses or other force inputs that satisfy a force threshold (which may represent a more forceful input than is typical for a standard "touch" input) Like the touch sensors 903, the force sensors 905 may be integrated with or otherwise configured to detect force inputs applied to any portion of the device 900. For example, the force sensors 905 may be configured to detect force inputs applied to any portion of the device 900 that includes a display (and may be integrated with a display). The force sensors 905 may operate in conjunction with the touch sensors 903 to generate signals or data in response to touch- and/or force-based inputs.

The device 900 may also include one or more haptic devices 906. The haptic device 906 may include one or more of a variety of haptic technologies such as, but not necessarily limited to, rotational haptic devices, linear actuators, piezoelectric devices, vibration elements, and so on. In general, the haptic device 906 may be configured to provide punctuated and distinct feedback to a user of the device. More particularly, the haptic device 906 may be adapted to produce a knock or tap sensation and/or a vibration sensation. Such haptic outputs may be provided in response to detection of touch and/or force inputs, and may be imparted to a user through the exterior surface of the device 900 (e.g., via a glass or other surface that acts as a touch- and/or force-sensitive display or surface).

The one or more communication channels 904 may include one or more wireless interface(s) that are adapted to provide communication between the processing unit(s) 901 and an external device. The one or more communication channels 904 may include antennas (e.g., antennas that include or use the housing members of the housing 104 as radiating members), communications circuitry, firmware, software, or any other components or systems that facilitate wireless communications with other devices. In general, the one or more communication channels 904 may be configured to transmit and receive data and/or signals that may be interpreted by instructions executed on the processing units 901. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communications channels 904 may also include ultra-wideband (UWB) interfaces, which may include any appropriate communications circuitry, instructions, and number and position of suitable UWB antennas.

As shown in FIG. 9, the device 900 may include a battery 907 that is used to store and provide power to the other components of the device 900. The battery 907 may be a rechargeable power supply that is configured to provide power to the device 900. The battery 907 may be coupled to charging systems (e.g., wired and/or wireless charging systems) and/or other circuitry to control the electrical power provided to the battery 907 and to control the electrical power provided from the battery 907 to the device 900.

The device 900 may also include one or more displays 908 configured to display graphical outputs. The displays 908 may use any suitable display technology, including liquid crystal displays (LCD), organic light emitting diodes (OLED), active-matrix organic light-emitting diode displays (AMOLED), or the like. The displays 908 may display graphical user interfaces, images, icons, or any other suitable graphical outputs. The display 908 may correspond to the display 103.

The device 900 may also provide audio input functionality via one or more audio input systems 909. The audio input systems 909 may include microphones, transducers, or other devices that capture sound for voice calls, video calls, audio recordings, video recordings, voice commands, and the like.

The device 900 may also provide audio output functionality via one or more audio output systems (e.g., speakers) 910. The audio output systems 910 may produce sound from voice calls, video calls, streaming or local audio content, streaming or local video content, or the like.

The device 900 may also include a positioning system 911. The positioning system 911 may be configured to determine the location of the device 900. For example, the positioning system 911 may include magnetometers, gyroscopes, accelerometers, optical sensors, cameras, global positioning system (GPS) receivers, inertial positioning systems, or the like. The positioning system 911 may be used to determine spatial parameters of the device 900, such as the location of the device 900 (e.g., geographical coordinates of the device), measurements or estimates of physical movement of the device 900, an orientation of the device 900, or the like.

The device 900 may also include one or more additional sensors 912 to receive inputs (e.g., from a user or another computer, device, system, network, etc.) or to detect any suitable property or parameter of the device, the environment surrounding the device, people or things interacting with the device (or nearby the device), or the like. For example, a device may include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 9 are disclosed as being part of, incorporated into, or performed by the device 900, it should be understood that various embodiments may omit any or all such described functionalities, operations, and structures. Thus, different embodiments of the device 900 may have some, none, or all of the various capabilities, apparatuses, physical features, modes, and operating parameters discussed herein. Further, the systems included in the device 900 are not exclusive, and the device 900 may include alternative or additional systems, components, modules, programs, instructions, or the like, that may be necessary or useful to perform the functions described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to.

What is claimed is:

1. A tablet computing system comprising:
   a housing member defining:
      a first portion of a back exterior surface of the tablet computing system;
      at least a portion of a side exterior surface of the tablet computing system;
      a raised rim extending from the back exterior surface and at least partially defining a hole surface of a sensor assembly hole extending through the housing member; and
      a support ledge feature extending from the hole surface into the sensor assembly hole;
   a frame member positioned at least partially in the sensor assembly hole and defining a complementary support ledge coupled to the support ledge;
   a camera bracket coupled to the frame member;
   a first camera module coupled to the camera bracket;
   a second camera module coupled to the camera bracket, the camera bracket fixing a position of the first camera module relative to the second camera module; and
   a cover member positioned in the sensor assembly hole and attached to the frame member, an exterior surface of the cover member defining a second portion of the back exterior surface of the tablet computing system.

2. The tablet computing system of claim 1, wherein:
   the raised rim defines a planar top surface; and
   the exterior surface of the cover member is flush with or recessed relative to the planar top surface of the raised rim.

3. The tablet computing system of claim 1, wherein the frame member defines a network of ribs configured to transfer impact force from a first portion of the housing member to a second portion of the housing member.

4. The tablet computing system of claim 3, wherein the frame member is fusion bonded to the housing member.

5. The tablet computing system of claim 1, wherein:
   the cover member defines:
      a first hole aligned with the first camera module; and
      a second hole aligned with the second camera module; and
   the tablet computing system further comprises:
      a first transparent camera window positioned in the first hole and covering the first camera module; and
      a second transparent camera window positioned in the second hole and covering the second camera module.

6. The tablet computing system of claim 1, wherein:
   the frame member defines:
      a first datum surface; and
      a second datum surface; and
   the tablet computing system further comprises:
      a first spring configured to apply a first force to the camera bracket in a first direction, thereby forcing the camera bracket against the first datum surface; and
      a second spring configured to apply a second force to the camera bracket in a second direction different from the first direction, thereby forcing the camera bracket against the second datum surface.

7. The tablet computing system of claim 1, wherein:
   the tablet computing system comprises a depth sensor coupled to the camera bracket and configured to determine a distance between the tablet computing system and an external object; and
   the cover member defines:
      an optically transmissive window region positioned over the depth sensor; and
      an opaque region at least partially surrounding the optically transmissive window region.

8. A tablet computing system comprising:
   a housing member defining:
      at least a portion of a back exterior surface of the tablet computing system;
      a raised rim extending from the back exterior surface and defining a first portion of a sensor assembly hole extending through the housing member, the first portion of the sensor assembly hole extending from an opening in the raised rim to a first support ledge within the hole and defined by the housing member; and
   a frame member positioned at least partially in the sensor assembly hole and coupled to the housing member, the frame member defining:
      a second support ledge attached to the first support ledge of the housing member;
      a first recess in a front side of the frame member;
      a second recess in a rear side of the frame member; and
      a first hole extending through the frame member from the first recess to the second recess;
   a cover member positioned in the sensor assembly hole and attached to the frame member, the cover member defining a second hole extending through the cover member; and
   a microphone module positioned in the second recess of the frame member and configured to receive sound via an acoustic path extending through the first hole in the frame member, a volume defined between the first recess and the cover member, and the second hole in the cover member.

9. The tablet computing system of claim 8, wherein the first hole and the second hole are not coaxial.

10. The tablet computing system of claim 8, wherein:
    the cover member is attached to the frame member with an adhesive; and
    the adhesive surrounds the first recess and defines a hermetic seal between the frame member and the cover member around the first recess.

11. The tablet computing system of claim 10, wherein:
    the adhesive is a first adhesive;
    the microphone module is attached to the frame member with a second adhesive; and
    the second adhesive defines a hermetic seal between the frame member and the microphone module.

12. The tablet computing system of claim 11, wherein the first and second adhesives hermetically seal the acoustic path from an internal volume of the tablet computing system.

13. The tablet computing system of claim 11, further comprising a microphone screen coupled to the cover member and covering the second hole.

14. The tablet computing system of claim 8, wherein:
the cover member defines a third hole extending through the cover member; and
the tablet computing system further comprises:
    a flash module coupled to the frame member; and
    a flash window positioned in the third hole and covering the flash module.

15. An electronic device comprising:
a housing member defining:
    a first portion of a back exterior surface of the electronic device;
    a sensor assembly hole extending through the housing member;
    a raised rim extending from the back exterior surface and at least partially surrounding the sensor assembly hole; and
    a support ledge extending inward into the sensor assembly hole and defining an engagement surface; and
a frame member positioned at least partially in the sensor assembly hole and mounted to the engagement surface;
a camera bracket coupled to the frame member;
a first camera module coupled to the camera bracket and comprising a camera lens having a first focal length;
a second camera module coupled to the camera bracket and comprising a camera lens having a second focal length different from the first focal length;
a depth sensor module coupled to the camera bracket and comprising:
    an optical emitter; and
    an optical sensor configured to detect light emitted by the optical emitter and reflected by an object external to the electronic device; and
a cover member positioned in the sensor assembly hole and defining a second portion of the back exterior surface of the electronic device.

16. The electronic device of claim 15, wherein:
the frame member defines a depth sensor hole configured to receive at least a portion of the depth sensor module; and
the electronic device further comprises:
    a conductive cowling at least partially surrounding the depth sensor hole and defining a plurality of conductive tabs extending into the depth sensor hole; and
    a compliant material configured to bias the plurality of conductive tabs against the depth sensor module.

17. The electronic device of claim 16, wherein:
the frame member is conductively coupled to a ground plane of the electronic device; and
the depth sensor module is conductively coupled to the frame member via the conductive cowling.

18. The electronic device of claim 17, wherein the conductive cowling comprises a metal foil.

19. The electronic device of claim 15, further comprising:
a microphone module coupled to the frame member; and
a flash module coupled to the frame member.

20. The electronic device of claim 15, wherein:
the frame member is welded to the housing member; and
the frame member defines a network of ribs configured to transfer impact force from a first portion of the housing member to a second portion of the housing member.

* * * * *